(12) United States Patent
Murakami

(10) Patent No.: US 6,317,510 B1
(45) Date of Patent: Nov. 13, 2001

(54) BLACKENING PROCESSING METHOD AND APPARATUS

(75) Inventor: Masayuki Murakami, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 09/216,860

(22) Filed: Dec. 21, 1998

(30) Foreign Application Priority Data

Dec. 19, 1997 (JP) .................................................. 9-351123
May 22, 1998 (JP) ................................................ 10-140680
Jun. 12, 1998 (JP) ................................................ 10-164775

(51) Int. Cl.[7] ........................................................ G06K 9/00
(52) U.S. Cl. ............................................................. 382/132
(58) Field of Search .................................... 382/128, 131, 382/132, 162, 163, 164, 181, 209, 218, 215, 217; 378/145, 147, 162, 165, 166, 182, 185, 186; 250/505.1, 506.1

(56) References Cited

U.S. PATENT DOCUMENTS

| | | | |
|---|---|---|---|
| 4,731,863 | * 3/1988 | Sezan et al. | 382/172 |
| 4,829,181 | * 5/1989 | Shimura | 250/584 |
| 4,851,678 | * 7/1989 | Adachi et al. | 250/587 |
| 4,891,757 | * 1/1990 | Shroy, Jr. et al. | 378/98.7 |
| 4,939,367 | * 7/1990 | Adachi | 250/582 |
| 4,952,805 | * 8/1990 | Tanaka | 250/586 |
| 4,962,539 | * 10/1990 | Takeo et al. | 382/180 |
| 4,967,079 | 10/1990 | Shimura | 250/586 |
| 5,028,782 | * 7/1991 | Nakajima | 250/587 |
| 5,040,225 | * 8/1991 | Gouge | 382/128 |
| 5,268,967 | * 12/1993 | Jang et al. | 382/132 |
| 5,732,149 | * 3/1998 | Kido et al. | 382/128 |
| 5,862,249 | * 1/1999 | Jang et al. | 382/132 |
| 5,892,840 | * 4/1999 | Jang et al. | 382/132 |

FOREIGN PATENT DOCUMENTS

| | | | |
|---|---|---|---|
| 63-100437 | 5/1988 | (JP) | G03B/42/02 |
| 3-98174 | 4/1991 | (JP) | G06F/15/68 |
| 10-154226 | 6/1998 | (JP) | G06T/1/00 |

* cited by examiner

Primary Examiner—Andrew W. Johns
Assistant Examiner—Shervin Nakhjavan
(74) Attorney, Agent, or Firm—Sughrue, Mion, Zinn Macpeak & Seas, PLLC

(57) ABSTRACT

Information representing a template, which has an irradiation field shape determined by a collimation plate used in an operation for recording a radiation image to be processed, is stored. An irradiation field on the radiation image is defined in accordance with the template. The irradiation field may be defined by carrying out matching of the template and the radiation image with each other. A blackening process for a region outside of the thus defined irradiation field on the radiation image is then carried out. An appropriate blackening process is thereby carried out quickly.

26 Claims, 13 Drawing Sheets

FIG. 5
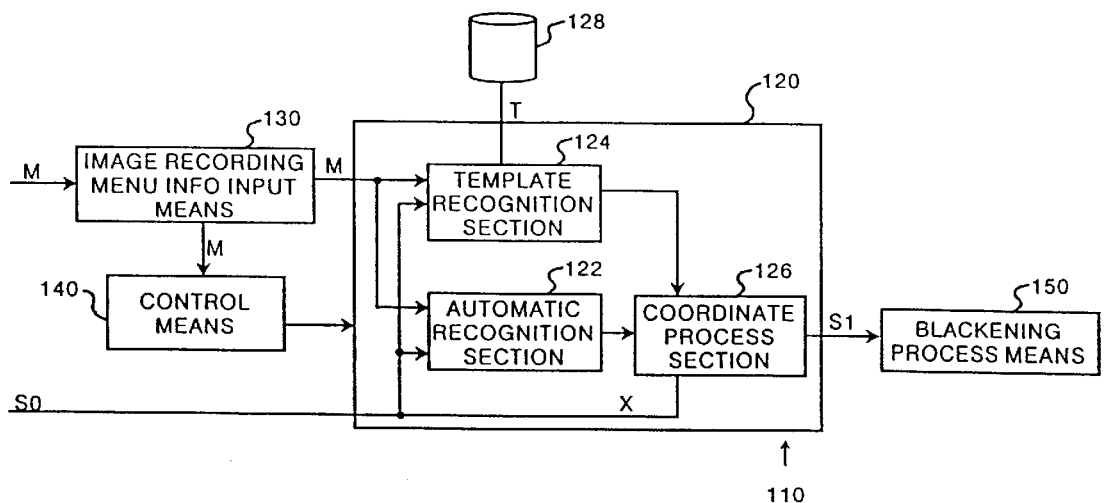
FIG. 6A
FIG. 6B
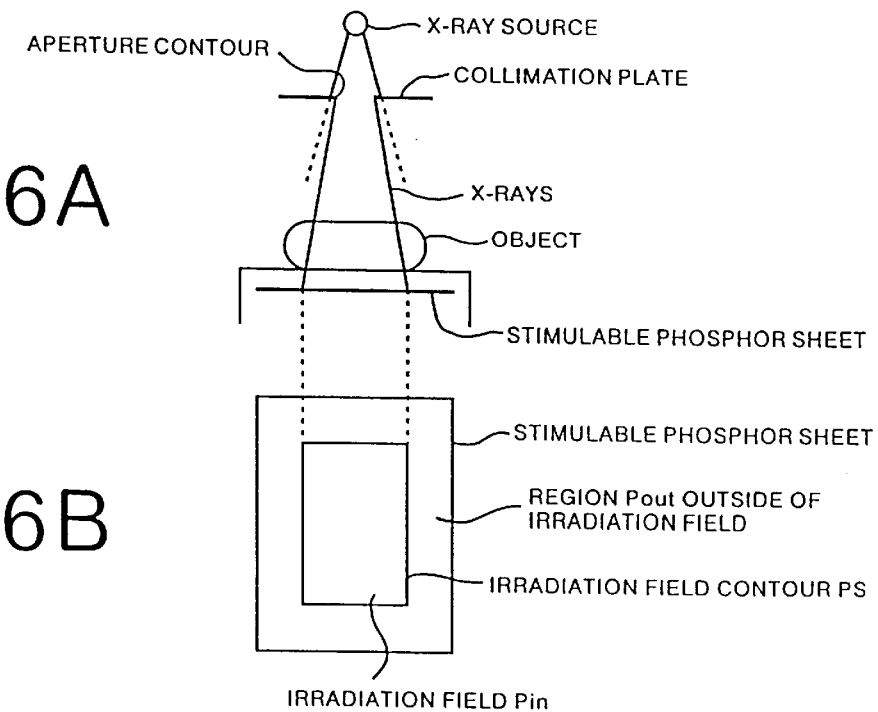

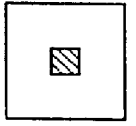

FIRST BLACKENING PROCESS
REGION DETERMINING PROCESSING

SECOND BLACKENING PROCESS
REGION DETERMINING PROCESSING

BLACKENING PROCESSING METHOD AND APPARATUS

BACKGROUND OF THE INVENTION

1. Field of the Invention

This invention relates to a method and apparatus for blackening processing for a region outside of an irradiation field, wherein a blackening process for a region outside of an irradiation field is carried out on a radiation image, which has been recorded by use of a collimation plate and has an irradiation field thereon. This invention also relates to a template matching method and device for carrying out matching of an image, in which an object pattern having a predetermined shape is embedded, and a template, which has a contour corresponding to the predetermined shape of the object pattern, with each other.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as such techniques, the applicant proposed various radiation image recording and reproducing systems which use stimulable phosphor sheets.

When a radiation image of an object, such as a living body, is recorded on a recording medium, it is desirable that adverse effects of radiation upon the living body due to irradiation to object portions not related to a diagnosis, or the like, can be kept as small as possible. Also, if object portions not related to a diagnosis, or the like, are exposed to radiation, the radiation will be scattered by such portions to the portion that is related to a diagnosis, or the like, and the image quality will be adversely affected by the scattered radiation. Therefore, when a radiation image is recorded on the recording medium, a collimation plate is often used in order to limit the irradiation field to an area smaller than the overall recording region of the recording medium, such that radiation may be irradiated only to that portion of the object, the image of which is to be used.

In cases where a radiation image is recorded on a recording medium by using a collimation plate, a region outside of the irradiation field is not exposed to the radiation. Therefore, in cases where the reproduced visible image is displayed on a CRT display device, the luminance of the region outside of the irradiation field becomes high on the visible image. Also, in cases where the visible image is reproduced on photographic film, the image density of the region outside of the irradiation field becomes low on the visible image. Therefore, when the reproduced visible image is seen, strong light comes from the region outside of the irradiation field on the visible image and enters the eyes of the person, who sees the visible image. Accordingly, even if the image within the irradiation field has good image quality and can serve as an effective tool in, particularly, the efficient and accurate diagnosis of an illness, the reproduced visible image gives a glaring feeling to the person, who sees it, and becomes hard to see.

In order to eliminate the aforesaid problems, the applicant proposed, in Japanese Unexamined Patent Publication No. 3(1991)-98174, an image processing method and apparatus, wherein image signal values representing a low level of luminance or a high level of image density (ordinarily, the lowest level of luminance or a highest level of image density) are allocated to the image signal values corresponding to the region, which is outside of the irradiation field. The processing for rendering the image density of the region outside of the irradiation field high (or rendering the luminance of the region outside of the irradiation field low) and thereby reducing the glaring feeling is ordinarily referred to as the high image density forming processing for the region outside of the irradiation field (or the blackening process for the region outside of the irradiation field). The term "low level of luminance" as used herein is employed in the cases where a visible image is displayed as a luminance distribution on a display screen of a CRT display device, or the like, i.e. a luminance display surface. Also, the term "high level of image density" as used herein is employed in the cases where a visible image is reproduced as an image density distribution on photographic film, or the like.

In order for the blackening process for the region outside of the irradiation field to be carried out, it is necessary to discriminate an irradiation field and the region outside of the irradiation field from each other with respect to a given radiation image. As techniques for recognizing an irradiation field, there have been employed the techniques comprising the steps of (a) setting a plurality of radial lines, which extend from a predetermined point contained in an irradiation field on an image toward ends of the image, (b) detecting an edge candidate point, which is considered as being located on a boundary (a contour) of the irradiation field, in accordance with image signal values corresponding to picture elements lying on each of the radial lines, a plurality of edge candidate points being thereby detected with respect to the plurality of the radial lines, and (c) recognizing the irradiation field in accordance with the thus detected edge candidate points. Such techniques are proposed in, for example, Japanese Unexamined Patent Publication No. 63(1988)-100437 and U.S. Pat. No. 4,967,079.

The proposed techniques are the techniques for automatically recognizing the irradiation field. However, in cases where the automatic recognition of the irradiation field is carried out, it often occurs that an incorrect region is recognized by mistake as the irradiation field. Also, since collimation plates having various different shapes are utilized, the problems occur in that, in order for the automatic recognition of the irradiation field to be carried out with respect to the collimation plates having various different shapes, algorithms cannot be kept simple, and the time required for the processing cannot be kept short.

SUMMARY OF THE INVENTION

The primary object of the present invention is to provide a method of blackening processing for a region outside of an irradiation field, with which an appropriate blackening process for a region outside of an irradiation field is capable of being carried out quickly.

Another object of the present invention is to provide a method of blackening processing for a region outside of an irradiation field, which is capable of coping with a wide variety of kinds of image recording menus.

A further object of the present invention is to provide an apparatus for carrying out the method of blackening processing for a region outside of an irradiation field.

A still further object of the present invention is to provide a template matching method, with which template matching is capable of being carried out quickly.

Another object of the present invention is to provide an apparatus for carrying out the template matching method.

The present invention provides a first method of blackening processing for a region outside of an irradiation field, wherein a blackening process for a region outside of an irradiation field is carried out on a radiation image, which has been recorded by use of a collimation plate and has an irradiation field thereon, the method comprising the steps of:

i) storing information representing a template, which has an irradiation field shape determined by a collimation plate used in an operation for recording a radiation image to be processed, ii) defining an irradiation field on the radiation image in accordance with the template, and iii) carrying out a blackening process for a region outside of the thus defined irradiation field on the radiation image.

The term "information representing a template" as used herein for the first method of blackening processing for a region outside of an irradiation field in accordance with the present invention means the information, which represents a template image serving as a mask image, the information concerning an irradiation field contour and serves as template image information, the information concerning vertexes of a polygon constituting a mask region, or the like.

The term "blackening process" as used herein means the processing for yielding glare preventing effects, which is carried out such that a reproduced visible radiation image can be prevented from becoming hard to see due to strong light coming from the region outside of the irradiation field on the visible image and entering the eyes of the person, who sees the visible image, when the visible image is seen, and such that the person, who sees the visible image, can be prevented from becoming fatigued. Specifically, the blackening process embraces the high image density forming processing, which is carried out in cases where a visible image is reproduced as an image density distribution on photographic film, or the like, and the low luminance forming processing, which is carried out in cases where a visible image is reproduced as a luminance distribution on a displaying screen of a CRT display device, i.e. on a luminance display surface. Examples of the blackening processes include processing for uniformly converting image signal values, which represent picture elements located in a region outside of an irradiation field, into a high image density value (or a low luminance value), processing for converting image signal values, which represent picture elements located in a region outside of an irradiation field, into image density values such that the image density values may become large from a contour of an irradiation field toward ends of the radiation image, and processing for adding a predetermined value to the original image signal values, which represent picture elements located in a region outside of an irradiation field.

The first method of blackening processing for a region outside of an irradiation field in accordance with the present invention should preferably be modified such that the method may further comprise the step of carrying out matching of the template and the radiation image with each other, and the irradiation field may be defined through the matching.

Also, the first method of blackening processing for a region outside of an irradiation field in accordance with the present invention may be modified such that a plurality of pieces of information representing different templates may be stored, and the method may further comprise the steps of:

inputting information concerning an irradiation field shape on the radiation image to be processed, and selecting a piece of information, which represents a template corresponding to the irradiation field shape, from the plurality of pieces of information representing different templates and in accordance with the inputted information.

Alternatively, the first method of blackening processing for a region outside of an irradiation field in accordance with the present invention may be modified such that a plurality of pieces of information representing different templates may be stored, and the method may further comprise the step of:

selecting a piece of information, which represents a template corresponding to the irradiation field shape, from the plurality of pieces of information representing different templates and in accordance with an image signal, which represents the radiation image to be processed.

By way of example, the information concerning an irradiation field shape may be the information, represents the irradiation field shape itself. Alternatively, the information concerning an irradiation field shape may be one of the other various kinds of information, with which a collimation plate, and consequently the irradiation field shape, can be specified. Examples of such kinds of information include the information representing a collimation plate used in the image recording operation (the irradiation field shape is determined by the collimation plate used in the image recording operation), the information representing the portion of an object the image of which is recorded (the collimation plate to be used is ordinarily determined in accordance with the portion of an object the image of which is recorded), and the information representing an image recording apparatus used (a specific collimation plate is often used in a specific image recording apparatus).

The first method of blackening processing for a region outside of an irradiation field in accordance with the present invention should preferably further comprise the step of forming the template.

The present invention also provides an apparatus for carrying out the first method of blackening processing for a region outside of an irradiation field in accordance with the present invention. Specifically, the present invention also provides a first apparatus for blackening processing for a region outside of an irradiation field, wherein a blackening process for a region outside of an irradiation field is carried out on a radiation image, which has been recorded by use of a collimation plate and has an irradiation field thereon, the apparatus comprising:

i) a template information storing means for storing information representing a template, which has an irradiation field shape determined by a collimation plate used in an operation for recording a radiation image to be processed, and ii) a blackening process means for defining an irradiation field on the radiation image in accordance with the template and carrying out a blackening process for a region outside of the irradiation field on the radiation image.

The first apparatus for blackening processing for a region outside of an irradiation field in accordance with the present invention should preferably further comprise a matching means for carrying out matching of the template and the radiation image with each other, and the irradiation field should preferably be defined through the matching.

Also, the first apparatus for blackening processing for a region outside of an irradiation field in accordance with the present invention may be modified such that the template information storing means may store a plurality of pieces of information representing different templates, and the apparatus may further comprise:

an input means for inputting information concerning an irradiation field shape on the radiation image to be processed, and a first template selecting means for selecting a piece of information, which represents a template corresponding to the irradiation field shape, from the plurality of pieces of information representing different templates and in accordance with the information inputted from the input means.

Alternatively, the first apparatus for blackening processing for a region outside of an irradiation field in accordance with the present invention may be modified such that the template information storing means may store a plurality of pieces of information representing different templates, and the apparatus may further comprise a second template selecting means for selecting apiece of information, which represents a template corresponding to the irradiation field shape, from the plurality of pieces of information representing different templates and in accordance with an image signal, which represents the radiation image to be processed.

The first apparatus for blackening processing for a region outside of an irradiation field in accordance with the present invention should preferably further comprise a template forming section for forming the template.

The present invention further provides a second method of blackening processing for a region outside of an irradiation field, wherein a blackening process for a region outside of an irradiation field is carried out on a radiation image, which has been recorded by use of a collimation plate and has an irradiation field thereon, the method comprising the steps of:

i) determining a region (a blackening process region), for which the blackening process is to be carried out, in accordance with one of at least two different recognition techniques for recognizing a region outside of an irradiation field, which have been set such that one of them is capable of being selected, ii) inputting image recording menu information, which represents an image recording menu employed in an image recording operation, and iii) selecting one of at least two different recognition techniques in accordance with the inputted image recording menu information.

The term "image recording menu" as used herein means the portion of an object the image of which is recorded, the orientation in which the object lies when the image of the object is recorded, the image recording mode, the image recording apparatus, the irradiation field shape, the age of the object, and the like. Examples of the image recording menus include chest image recording, angiography, and mammography. Also, the image recording menu information may be inputted as attendant information appended to the image signal, such as a header of the image signal. Alternatively, the image recording menu information may be inputted as information independent of the image signal.

In the second method of blackening processing for a region outside of an irradiation field in accordance with the present invention, at least two different recognition techniques should preferably contain a first technique (an automatic recognition technique), with which the region outside of the irradiation field is recognized in accordance with an image signal representing the radiation image, and a second technique (a template recognition technique), with which the region outside of the irradiation field is recognized in accordance with template information corresponding to the collimation plate.

Also, at least either one of the first technique and the second technique should preferably be a technique for recognizing the region outside of the irradiation field by utilizing the image recording menu information.

The term "template information" as used herein for the second apparatus for blackening processing for a region outside of an irradiation field in accordance with the present invention means the information, which represents a irradiation field contour corresponding to the collimation plate employed in the image recording operation. The template information may be the information, which represents a template image representing the contour shape itself, the information concerning the irradiation field contour, the coordinate information concerning vertexes of a polygon constituting the irradiation field, or the like.

As the automatic recognition technique, it is possible to employ the processing, in which edge candidate points in an image are detected in accordance with differences between image signal values, or the like, and an edge line is obtained in accordance with the detected edge candidate points. Such processing is proposed in, for example, U.S. Pat. No. 4,967,079. It is also possible to employ any of other known types of irradiation field recognition processing, such as dynamic contour extraction processing, in which snakes algorithms, and the like, are utilized, and contour extraction processing, in which Hough transform is utilized.

As the template recognition technique, any of techniques, in which the region outside of an irradiation field is recognized in accordance with the template information corresponding to a collimation plate, may be employed. Examples of the template recognition techniques include a technique for carrying out the matching of a single piece of stored template information and an image signal with each other in order to carry out selection of a shape of a collimation plate and adjustments of the position and inclination of the collimation plate, a technique for selecting a single piece of template information, which corresponds to an image recording menu, from a plurality of pieces of stored template information and carrying out the matching of the selected template information and an image signal with each other, and a technique for carrying out the matching with each of a plurality of pieces of stored template information and using a piece of template information, which has the highest degree of matching. Also, in cases where the image recording menu is utilized for the template recognition technique, information, with which a collimation plate, and consequently the irradiation field shape, can be specified, should preferably be contained in the image recording menu and utilized. Examples of such kinds of information include the information representing the irradiation field shape, the information representing a collimation plate used in the image recording operation (the irradiation field shape is determined by the collimation plate used in the image recording operation), the information representing the portion of an object the image of which is recorded (the collimation plate to be used is ordinarily determined in accordance with the portion of an object the image of which is recorded), and the information representing an image recording apparatus used (a specific collimation plate is often used in a specific image recording apparatus). Further, as the template recognition technique, a technique may be employed wherein, instead of the matching being carried out, a region itself, which is obtained from predetermined template information, is utilized, and adjustments of the position and inclination of the irradiation field are not carried out.

In the second method of blackening processing for a region outside of an irradiation field in accordance with the present invention, besides at least two different recognition techniques, a technique for recognizing the absence of a region outside of an irradiation field should preferably be also set such that it is capable of being selected.

The term "technique for recognizing the absence of a region outside of an irradiation field" as used herein means the technique, wherein information concerning the blackening process region is outputted such that, even if a blackening process were carried out on the image signal in a subsequent blackening process step in accordance with the information concerning the determined blackening process region, substantially no blackening process would occur, i.e., the blackening process for the region outside of the irradiation field would not be carried out.

In the second method of blackening processing for a region outside of an irradiation field in accordance with the present invention, wherein the technique for recognizing the absence of a region outside of an irradiation field can be selected, in cases where the determined blackening process region is represented by coordinate information and the technique for recognizing the absence of a region outside of an irradiation field is selected, as coordinate values, which represent the determined blackening process region, coordinate values should preferably be outputted such that the side outward from a coordinate region representing the image signal may be set as the blackening process region.

Further, the second method of blackening processing for a region outside of an irradiation field in accordance with the present invention should preferably further comprise the steps of:

displaying the determined blackening process region as a visible image, and correcting the displayed blackening process region.

In such cases, the displaying of the blackening process region may be carried out in one of various ways such that the determined blackening process region can be confirmed. For example, the entire area of the blackening process region may be displayed. Alternatively, only the contour of the irradiation field having been detected may be displayed. In such cases, the entire area of the blackening process region or the contour of the irradiation field should preferably be displayed by being overlapped upon the original image.

Also, the correction of the blackening process region may be carried in one of various ways such that the blackening process region can be corrected. For example, information (e.g., coordinate values) concerning the irradiation field contour may be successively inputted with a mouse device, or the like, and a new contour line may be formed by connecting the inputted information points. Such a technique is proposed in, for example, Japanese Unexamined Patent Publication No. 10(1998)-154226. Alternatively, subsidiary information, which is useful for accurately carrying out the recognition of the region outside of the irradiation field, may be inputted, the recognition of the irradiation field may again be carried out by taking the subsidiary information as a precondition, and the blackening process region may thereby be determined. Specifically, for example, in cases where the subsidiary information, which represents that the irradiation field pattern has a circular shape, is inputted, the recognition processing may be carried out such that an approximately circular irradiation field pattern may be obtained. The subsidiary information is the information, which is useful for accurately carrying out the processing for recognizing the irradiation field. Examples of the subsidiary information include the information representing the type of the irradiation field pattern, which represents the shape of the irradiation field contour, the information representing whether a plurality of irradiation fields are or are not located on the radiation image, the information representing the type of the subdivision pattern, which represents the locations of the plurality of the irradiation fields, in cases where the plurality of the irradiation fields are located on the radiation image (the pattern, in which only one irradiation field is located on the radiation image, is also included as one type of the subdivision pattern), and the information representing the position of a point in each irradiation field (e.g., a center point in each irradiation field). The subsidiary information may also contain the information, which represents whether an irradiation field is or is not located on the radiation image. Specifically, as for an apparatus, in which the irradiation field recognition processing is carried out automatically in accordance with an image signal regardless of whether the radiation image is or is not the one recorded by using a collimation plate, the presence or absence of an irradiation field is the information useful for accurately carrying out the irradiation field recognition processing. In cases where no irradiation field is located on the radiation image and an irradiation field candidate is detected by mistake by carrying out erroneous processing for detecting an irradiation field candidate, the information representing the presence or absence of an irradiation field is very efficient for making a correction. Further, the subsidiary information may be contained in the image recording menu, and the recognition of the region outside of the irradiation field may be carried out by utilizing the subsidiary information in the aforesaid automatic recognition technique. In this manner, the automatic recognition of the region outside of the irradiation field may be carried out by utilizing the subsidiary information from the beginning.

Ordinarily, in cases where the recognition of the region outside of the irradiation field is carried out with the automatic recognition technique, it often occurs that a region coinciding with the actual irradiation field contour is not obtained. In view of such findings, the aforesaid correction of the blackening process region may be carried out only when the automatic recognition technique is selected. Also, in view of such findings, instead of the correction of the blackening process region being carried out after the step of determining the blackening process region, the irradiation field contour, which has been recognized with the aforesaid automatic recognition technique, may be corrected.

The second method of blackening processing for a region outside of an irradiation field in accordance with the present invention should preferably be modified such that an automatic forming technique, with which the template information is formed automatically in accordance with the image signal, and a manual forming technique, with which the template information is formed manually by using a user interface, may be set such that they are capable of being selectively changed over to each other.

The term "automatic forming technique with which template information is formed automatically" as used herein means the technique, wherein irradiation field recognition processing for detecting the irradiation field contour in accordance with the image signal is carried out. By way of example, with the irradiation field recognition processing, a radiation image may be recorded without an object lying at the position for image recording and by utilizing a collimation plate, which is used when an image of a predetermined portion of an object is to be recorded. An image signal representing the thus recorded radiation image may then be binarized, and an irradiation field contour may be detected from the binarized image signal. The irradiation field recognition processing may be carried out in one of various ways. For example, a change in image density may be found along a radial line extending from the center point of the image, and a portion (an edge), at which the difference in image density with respect to an adjacent picture element is equal to at least a predetermined value, may thereby be detected. Alternatively, a technique for tracing a side of a binarized region may be employed. Instead of the radiation image being recorded without an object lying at the position for image recording, the radiation image may be recorded with an object lying at the position for image recording, and the aforesaid automatic recognition processing may be carried out on the radiation image, in which the object image pattern is embedded. In this manner, the irradiation field contour may be detected.

The term "manual forming technique with which template information is formed manually" as used herein means the technique, wherein the template information is formed with manual operations of the operator. For example, with the manual forming technique, the user may directly specify the contour by scanning a pointer on a display screen by use of a mouse device, or the like, and the template information may thereby be formed. In such cases, known drawing software functions, which are ordinarily used in personal computers, may be utilized.

The present invention still further provides an apparatus for carrying out the second method of blackening processing for a region outside of an irradiation field in accordance with the present invention. Specifically, the present invention still further provides a second apparatus for blackening processing for a region outside of an irradiation field, wherein a blackening process for a region outside of an irradiation field is carried out on a radiation image, which has been recorded by use of a collimation plate and has an irradiation field thereon, the apparatus comprising:

i) a blackening process region determining means for determining a region (a blackening process region), for which the blackening process is to be carried out, in accordance with one of at least two different recognition techniques for recognizing a region outside of an irradiation field, which have been set such that one of them is capable of being selected, ii) an image recording menu information input means for inputting image recording menu information, which represents an image recording menu employed in an image recording operation, and iii) a control means for causing the blackening process region determining means to select one of at least two different recognition techniques in accordance with the image recording menu information inputted from the image recording menu information input means.

In the second apparatus for blackening processing for a region outside of an irradiation field in accordance with the present invention, at least two different recognition techniques should preferably contain a first technique (an automatic recognition technique), with which the region outside of the irradiation field is recognized in accordance with an image signal representing the radiation image, and a second technique (a template recognition technique), with which the region outside of the irradiation field is recognized in accordance with template information corresponding to the collimation plate.

Also, at least either one of the first technique and the second technique should preferably be a technique for recognizing the region outside of the irradiation field by utilizing the image recording menu information.

In the second apparatus for blackening processing for a region outside of an irradiation field in accordance with the present invention, the blackening process region determining means should preferably be capable of selecting, besides at least two different recognition techniques, a technique for recognizing the absence of a region outside of an irradiation field.

The second apparatus for blackening processing for a region outside of an irradiation field in accordance with the present invention, wherein the technique for recognizing the absence of a region outside of an irradiation field can be selected, should preferably be modified such that the blackening process region determining means may output the determined blackening process region as coordinate information and may operate such that, in cases where the technique for recognizing the absence of a region outside of an irradiation field is selected, the blackening process region determining means may output, as coordinate values, which represent the determined blackening process region, coordinate values such that the side outward from a coordinate region representing the image signal may be set as the blackening process region.

Further, the second apparatus for blackening processing for a region outside of an irradiation field in accordance with the present invention should preferably further comprise:

a displaying means for displaying the blackening process region, which has been determined by the blackening process region determining means, as a visible image, and a blackening process region correcting means for correcting the blackening process region, which is displayed on the displaying means.

The second apparatus for blackening processing for a region outside of an irradiation field in accordance with the present invention should preferably further comprise a template information forming section constituted such that an automatic forming technique, with which the template information is formed automatically in accordance with the image signal, and a manual forming technique, with which the template information is formed manually by using a user interface, may be capable of being selectively changed over to each other.

The present invention also provides a template matching method, wherein matching of an image, in which an object pattern having a predetermined shape is embedded, and a template, which has a contour of the predetermined shape, with each other is carried out, the object pattern having horizontal line components, which are located approximately along a horizontal direction with respect to a predetermined direction, and vertical line components, which are located approximately along a vertical direction that is normal to the horizontal direction, the method comprising the steps of:

i) setting a horizontal search range and a vertical search range on the image, the horizontal search range containing a horizontal coordinate point, which has been set on the contour of the template and corresponds to one of the horizontal line components, the vertical search range containing a vertical coordinate point, which has been set on the contour of the template and corresponds to one of the vertical line components, ii) calculating a vertical distance between the horizontal line component and the corresponding horizontal coordinate point in the horizontal search range, which distance is taken along the vertical direction, the calculation being made in accordance with picture element values of the image in the horizontal search range, iii) calculating a horizontal distance between the vertical line component and the corresponding vertical coordinate point in the vertical search range, which distance is taken along the horizontal direction, the calculation being made in accordance with picture element values of the image in the vertical search range, and iv) translating the template by the vertical distance and the horizontal distance with respect to the image, whereby the matching of the image and the template with each other is carried out.

In the template matching method in accordance with the present invention, at least one horizontal coordinate point and at least one vertical coordinate point are set. In cases where a plurality of horizontal coordinate points are set, the horizontal search range is set for each of the horizontal coordinate points. Also, in cases where a plurality of vertical coordinate points are set, the vertical search range is set for each of the vertical coordinate points. In each of the horizontal search ranges, the vertical distance between the horizontal line component and the corresponding horizontal coordinate point is calculated. Further, in each of the vertical search ranges, the horizontal distance between the vertical line component and the corresponding vertical coordinate point is calculated.

The present invention further provides a template matching device, wherein matching of an image, in which an object pattern having a predetermined shape is embedded, and a template, which has a contour of the predetermined shape, with each other is carried out, the object pattern having horizontal line components, which are located approximately along a horizontal direction with respect to a predetermined direction, and vertical line components, which are located approximately along a vertical direction that is normal to the horizontal direction, the device comprising:

i) a search range setting means for setting a horizontal search range and a vertical search range on the image, the horizontal search range containing a horizontal coordinate point, which has been set on the contour of the template and corresponds to one of the horizontal line components, the vertical search range containing a vertical coordinate point, which has been set on the contour of the template and corresponds to one of the vertical line components, ii) a vertical distance calculating means for calculating a vertical distance between the horizontal line component and the corresponding horizontal coordinate point in the horizontal search range, which distance is taken along the vertical direction, the calculation being made in accordance with picture element values of the image in the horizontal search range, iii) a horizontal distance calculating means for calculating a horizontal distance between the vertical line component and the corresponding vertical coordinate point in the vertical search range, which distance is taken along the horizontal direction, the calculation being made in accordance with picture element values of the image in the vertical search range, and iv) a translation means for translating the template by the vertical distance and the horizontal distance with respect to the image and thereby carrying out the matching of the image and the template with each other.

With the first method and apparatus for blackening processing for a region outside of an irradiation field in accordance with the present invention, the information representing the template, which is to be used for the blackening process and corresponds to the collimation plate used in the operation for recording the radiation image, is stored previously. The irradiation field on the radiation image is then defined in accordance with the template, and the blackening process is carried out for the region outside of the thus defined irradiation field. Therefore, the processing can be carried out more easily and more quickly than with the conventional method, in which an irradiation field is recognized automatically and a blackening process is then carried out.

With the second method and apparatus for blackening processing for a region outside of an irradiation field in accordance with the present invention, one of at least two different recognition techniques for recognizing a region outside of an irradiation field is selected in accordance with the image recording menu information, and the blackening process region is determined in accordance with the selected recognition technique. Therefore, a recognition technique for recognizing a region outside of an irradiation field, which technique is appropriate for the image recording menu, can be selected, and the blackening process region can be determined in accordance with the appropriate recognition technique. Accordingly, the second method and apparatus for blackening processing for a region outside of an irradiation field in accordance with the present invention can cope with a wide variety of kinds of image recording menus. This feature is advantageous over the conventional method, in which the recognition of the region outside of the irradiation field is carried out in accordance with only one fixed recognition technique and which can therefore cope with only the limited number of kinds of image recording menus.

In cases where at least two different recognition techniques for recognizing a region outside of an irradiation field include the automatic recognition technique and the template recognition technique, the automatic recognition can be carried out accurately, or the recognition can be carried out with the simple and easy template recognition technique. In such cases, if the image recording menu information is utilized, the recognition can be carried out more accurately. For example, as for an image recording menu for which the region outside of the irradiation field can be recognized accurately with the automatic recognition technique, the automatic recognition technique may be selected. As for an image recording menu for which the region outside of the irradiation field cannot be recognized accurately with the automatic recognition technique, the template information may be stored previously, and the recognition may be carried out in accordance with the template information. Also, as for an image recording menu for which the automatic recognition technique should not be employed since, for example, the processing algorithms cannot be kept simple, the template information may be stored previously, and the recognition may be carried out in accordance with the template information.

With the second method and apparatus for blackening processing for a region outside of an irradiation field in accordance with the present invention, wherein the technique for recognizing the absence of a region outside of an irradiation field can be selected, in cases where the accurate recognition cannot be carried out with at least two different recognition techniques described above, it can be set such that the blackening process may not be carried out. Also, in cases where the determined blackening process region is represented by the coordinate information and the technique for recognizing the absence of a region outside of an irradiation field is selected, as the coordinate values, which represent the determined blackening process region, the coordinate values may be outputted such that the side outward from the coordinate region representing the image signal may be set as the blackening process region. In such cases, even if the blackening process is carried out in accordance with the outputted coordinate values, which represent the blackening process region, in the same manner as that when one of at least two different recognition techniques described above is selected, since the coordinate values are the ones which represent the side outward from the coordinate region representing the image signal, substantially no blackening process will occur. Therefore, a particular means need not be provided as means for setting such that the blackening process may not be carried out.

With the second method and apparatus for blackening processing for a region outside of an irradiation field in accordance with the present invention, wherein the determined blackening process region is displayed as a visible image and the displayed blackening process region is corrected, in cases where one of at least two different recognition techniques described above is selected and the determined blackening process region is not an appropriate one, the determined blackening process region can be corrected into a desired shape. Therefore, the problems do not occur in that an image portion, which is to be used, is blackened with the blackening process, or in that an image portion, which has the lowest level of image density and is to be blackened, remains unblackened. Also, it becomes possible to operate such that the technique for recognizing the absence of a region outside of an irradiation field may be selected, and the blackening process region may be specified manually from the beginning.

Further, with the second method and apparatus for blackening processing for a region outside of an irradiation field in accordance with the present invention, wherein the automatic forming technique, with which the template information is formed automatically in accordance with the image signal, and the manual forming technique, with which the template information is formed manually by using a user interface, can be selectively changed over to each other, the recognition with the template recognition technique can be carried out with respect to an increased number of kinds of image recording menus.

With the template matching method and device in accordance with the present invention, the matching of the image, in which the object pattern having the predetermined shape is embedded, and the template, which has the contour of the predetermined shape, with each other is carried out. The object pattern has the horizontal line components, which are located approximately along the horizontal direction with respect to the predetermined direction, and the vertical line components, which are located approximately along the vertical direction that is normal to the horizontal direction. With the template matching method and device, firstly, the horizontal search range and the vertical search range are set on the image. The horizontal search range contains the horizontal coordinate point, which has been set on the contour of the template and corresponds to one of the horizontal line components. The vertical search range contains the vertical coordinate point, which has been set on the contour of the template and corresponds to one of the vertical line components. Thereafter, a calculation is made to find the vertical distance between the horizontal line component and the corresponding horizontal coordinate point in the horizontal search range. The calculation is made in accordance with picture element values of the image in the horizontal search range. Specifically, for example, the position of the horizontal line component is found by calculating differentiation values of the picture element values of the image in the horizontal search range, and the vertical distance between the position of the horizontal line component and the corresponding horizontal coordinate point is calculated. In the same manner, a calculation is made to find the horizontal distance between the vertical line component and the corresponding vertical coordinate point in the vertical search range. The calculation is made in accordance with picture element values of the image in the vertical search range. Thereafter, the template is translated by the vertical distance and the horizontal distance with respect to the image. In this manner, the matching of the position of the image and the position of the template with each other, i.e. the template matching, is carried out.

In this manner, with the template matching method and device in accordance with the present invention, the template matching can be carried out by merely making calculations on the picture element values in the horizontal search range and the vertical search range. Therefore, the time required to carry out the calculations for the template matching can be kept markedly shorter than with the conventional technique, in which the calculations for the template matching are carried out with respect to all of the picture elements in the image by shifting the image and the template successively by a distance corresponding to a single picture element.

BRIEF DESCRIPTION OF THE DRAWINGS

FIG. 5 is a block diagram showing a fourth embodiment of the apparatus for blackening processing for a region outside of an irradiation field in accordance with the present invention, FIG. 6A is a schematic view showing a radiation image recording apparatus, in which a collimation plate is utilized, FIG. 6B is a schematic view showing a stimulable phosphor sheet, on which a radiation image has been recorded by use of the collimation plate and an irradiation field contour corresponding to an aperture contour of the collimation plate has been formed, FIG. 11 is an explanatory view showing a subsidiary information input menu.

DESCRIPTION OF THE PREFERRED EMBODIMENTS

The present invention will hereinbelow be described in further detail with reference to the accompanying drawings.

Figure 1:
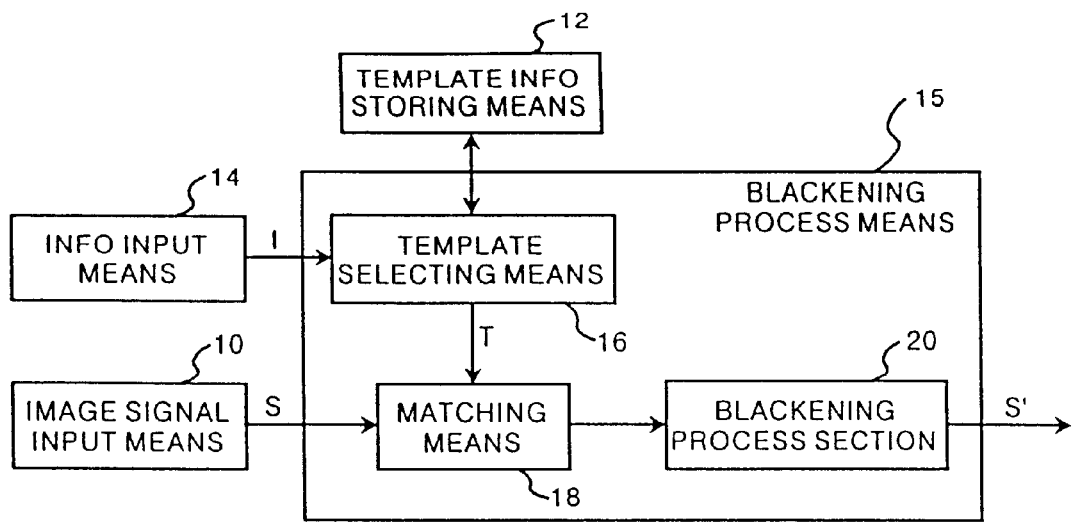
FIG. 1 is a block diagram showing a first embodiment of the apparatus for blackening processing for a region outside of an irradiation field in accordance with the present invention.

FIG. 1 is a block diagram showing a first embodiment of the apparatus for blackening processing for a region outside of an irradiation field in accordance with the present invention.

The blackening processing apparatus shown in FIG. 1 comprises an image signal input means 10 for inputting an image signal S, which represents a radiation image to be processed, and a template information storing means 12 for storing a plurality of pieces of information representing different templates for a blackening process. The blackening processing apparatus also comprises an information input means 14 for inputting information I concerning an irradiation field shape, such as information representing the portion of an object the image of which is recorded. The blackening processing apparatus further comprises a blackening process means 15 for defining an irradiation field on the radiation image in accordance with the information, which represents a template, and carrying out a blackening process for a region outside of the irradiation field on the radiation image. A blackening-processed image signal S' is obtained from the blackening process means 15.

The blackening process means 15 comprises a template selecting means 16 for selecting the template information T representing a template, which corresponds to a collimation plate used in an operation for recording the radiation image, i.e. which corresponds to the irradiation field shape formed on the radiation image, from the template information storing means 12 and in accordance with the information I received from the information input means 14. The blackening process means 15 also comprises a matching means 18, which receives the image signal S representing the radiation image and the template information T having been selected by the template selecting means 16. The matching means 18 carries out matching of the image, which is represented by the image signal S, and the template, which is represented by the template information T, with each other. The matching is carried out with respect to the orientations and the positions of the image and the template. The blackening process means 15 further comprises a blackening process section 20 for carrying out the blackening process for the region outside of the irradiation field on the radiation image, whose irradiation field has been defined through the matching.

The template information storing means 12 stores the information representing the template, which corresponds to each collimation plate, i.e. each irradiation field shape.

Ordinarily, the collimation plate used in the radiation image recording operation is specified for each portion of the object the image of which is recorded. The shape of the irradiation field on the radiation image is determined by the shape of the collimation plate.

How the blackening processing method is carried out with this embodiment of the blackening processing apparatus will be described hereinbelow.

The image signals representing the radiation image to be processed is fed from the image signal input means 10 into the matching means 18. At the same time, image kind information I, which represents the kind of the radiation image (the portion of the object the image of which is recorded), is fed as the information concerning the irradiation field shape from the information input means 14 into the template selecting means 16. The template selecting means 16 selects the template information T representing the template, which corresponds to the collimation plate used in the radiation image recording operation, from the template information storing means 12. The template information T is fed into the matching means 18.

In the matching means 18, the matching of the radiation image, which is represented by the image signal S, and the template, which is represented by the template information T, with each other is carried out with respect to the orientations and the positions of the image and the template. Also, in the blackening process section 20, the template is utilized as a mask, and the blackening process for the region outside of the irradiation field is carried out on the radiation image, and the blackening-processed image signal S' is thereby obtained.

No limitation is imposed upon the technique for the blackening process carried out in the blackening process section 20, i.e. the technique for converting the image signal values, which correspond to the region outside of the irradiation field, into a low level of luminance (or a high level of image density). By way of example, the aforesaid technique disclosed in, for example, Japanese Unexamined Patent Publication No. 3(1991)-98174, may be employed.

In this embodiment, the template information storing means 12 stores the plurality of pieces of information representing different templates for the blackening process. In cases where only the radiation images having been recorded by using a predetermined collimation plate are to be processed as in a blackening processing apparatus provided in a mamma image recording apparatus, it is sufficient for only one piece of template information to be provided. In such cases, the template selecting means 16 is unnecessary, and the matching and the blackening process may be carried out by utilizing the only one piece of template information.

Figure 2:
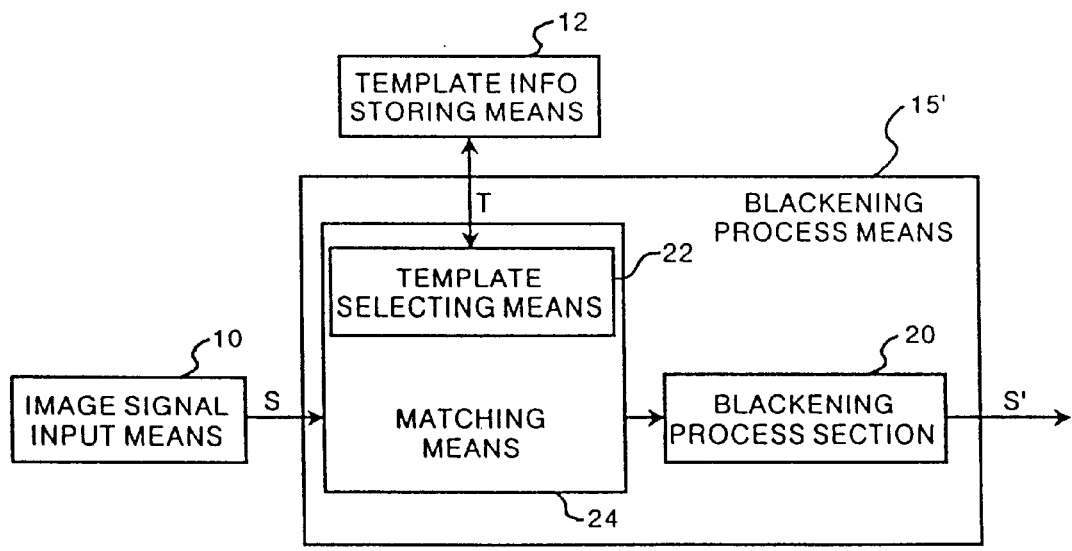
FIG. 2 is a block diagram showing a second embodiment of the apparatus for blackening processing for a region outside of an irradiation field in accordance with the present invention.

A second embodiment of the blackening processing apparatus in accordance with the present invention will be described hereinbelow with reference to FIG. 2.

In the second embodiment, a blackening process means 15' comprises a matching means 24 provided with a template selecting means 22 for carrying out the matching of the radiation image to be processed and each template with each other in accordance with the received image signal S and selecting a template, which has the highest degree of matching, as the template for defining the irradiation field on the image.

In the second embodiment, the image signal S representing the image to be processed is fed from the image signal input means 10 into the matching means 24. In the matching means 24, the matching of the image to be processed and each of a plurality of templates, which are stored in the template information storing means 12, with each other is carried out. The template selecting means 22 selects the template, which has the highest degree of matching, as the template corresponding to the irradiation field on the image to be processed. The irradiation field is defined by the selected template. Thereafter, in the same manner as that in the first embodiment described above, the blackening process for the region outside of the irradiation field is carried out in the blackening process section 20, and the blackening-processed image signal S' is thereby obtained.

Figure 3:
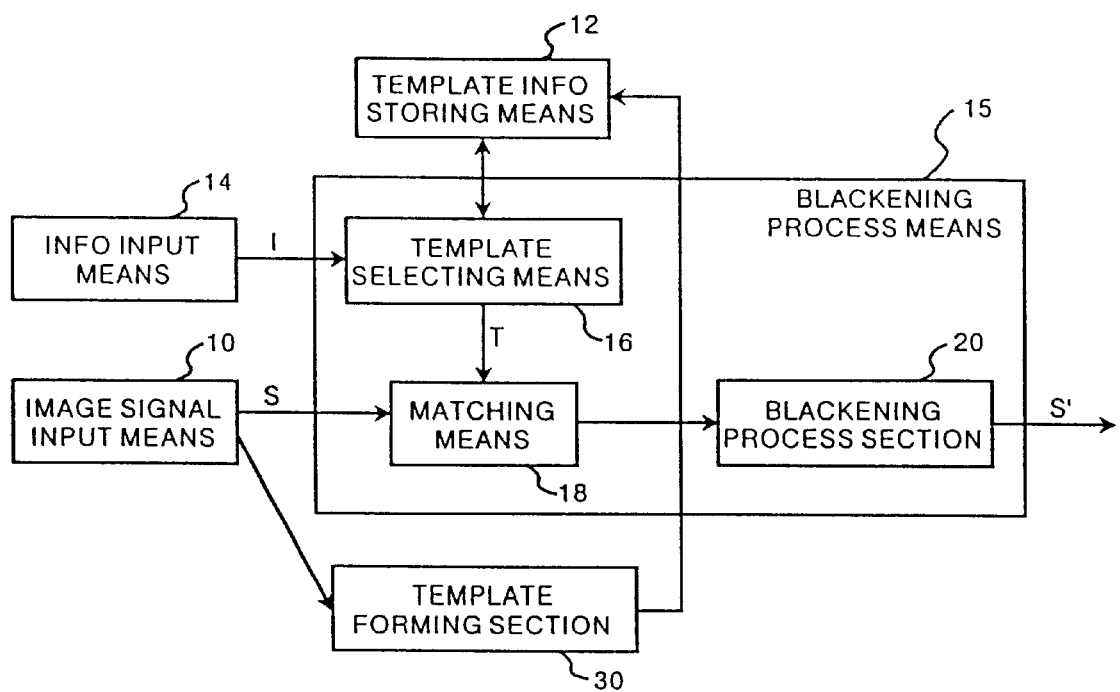
FIG. 3 is a block diagram showing a third embodiment of the apparatus for blackening processing for a region outside of an irradiation field in accordance with the present invention.

A third embodiment of the blackening processing apparatus in accordance with the present invention will be described hereinbelow with reference to FIG. 3.

The third embodiment is the same as the first embodiment described above, except that a template forming section 30 is further provided. In FIG. 3, similar elements are numbered with the same reference numerals with respect to FIG. 1.

In the third embodiment, firstly, a radiation image is recorded without an object lying at the position for image recording and by utilizing a collimation plate. An image signal St representing the thus recorded image is fed from the image signal input means 10 into the template forming section 30. In the template forming section 30, the irradiation field determined by the collimation plate is recognized from the image signal St, and a template of the irradiation field, which is formed when the collimation plate is used, is thereby formed. The template having been formed by the template forming section 30 is stored as template information in the template information storing means 12. In this manner, with respect to radiation images, which have been recorded without an object lying at the position for image recording and by utilizing collimation plates in accordance with objects (portions of objects the images of which are recorded), templates of the irradiation fields on the radiation images are formed. Also, pieces of information representing the formed templates are stored in the template information storing means 12.

Thereafter, the image signal S representing the radiation image to be processed is fed from the image signal input means 10 into the matching means 18. At the same time, the image kind information I, which represents the kind of the radiation image (the portion of the object the image of which is recorded), is fed as the information concerning the irradiation field shape from the information input means 14 into the template selecting means 16. The blackening process is thus carried out on the radiation image in the same manner as that in the first embodiment described above.

Figure 4:
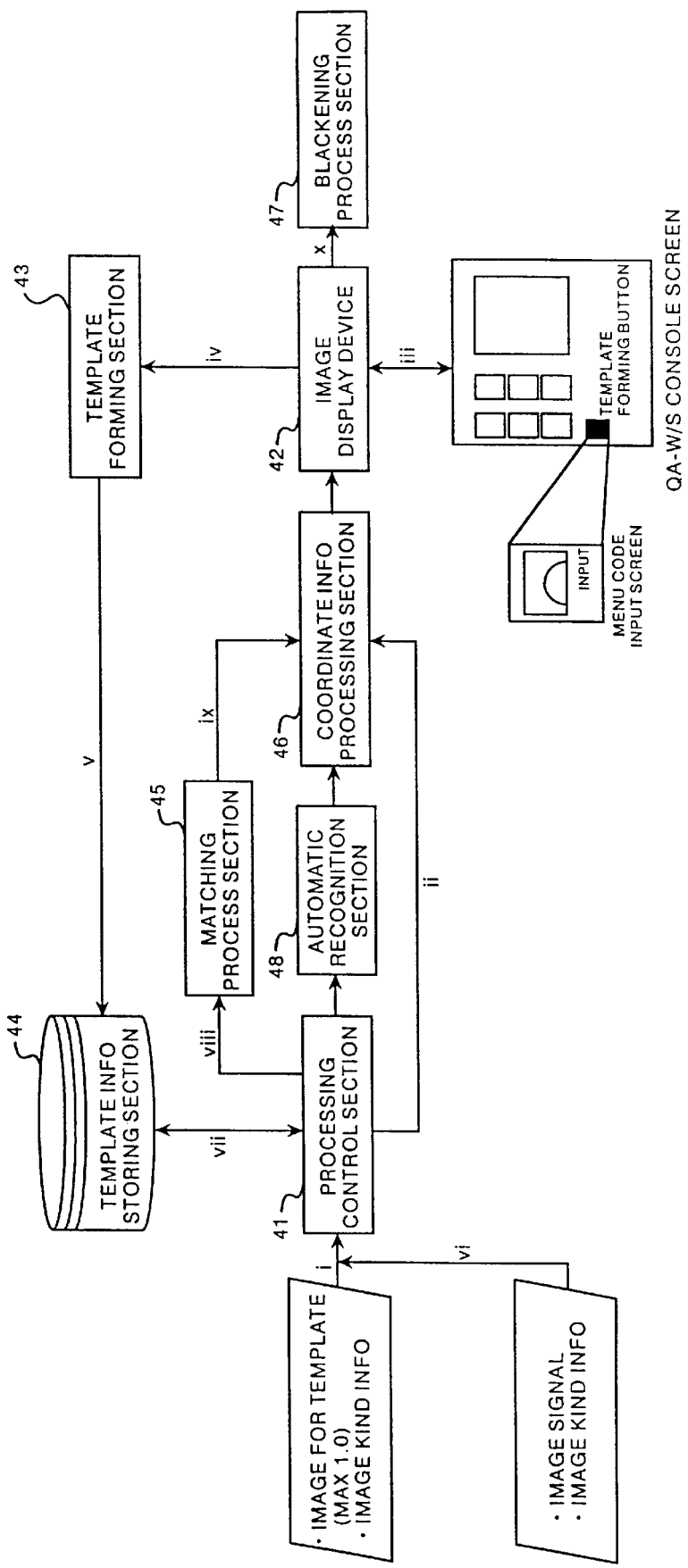
FIG. 4 is a block diagram showing how processing is carried out in the third embodiment.

FIG. 4 shows how processing is carried out in a blackening processing system, in which the third embodiment of the blackening processing apparatus is employed. The blackening processing system can cope with the cases where the irradiation field on the image to be processed is defined by utilizing the template, the cases where the automatic recognition technique is employed, and the cases where the irradiation field on the image to be processed is specified by the user and on an image displayed on a display screen.

With reference to FIG. 4, the blackening processing system comprises a processing control section 41, which receives the image signal representing the radiation image to be processed and the image kind information including irradiation field shape information, and controls the processing carried out on the image. The blackening processing system also comprises an image display device 42, such as a CRT display device, for displaying an image such that the user can confirm the image and can specify processing instructions. (In this example, the image display device 42 is constituted of a display screen of a work station.) The blackening processing system further comprises a template forming section 43, which receives the instructions specified by the user and carries out template formation, and a template information storing section 44 for storing the information representing the template having been formed by the template forming section 43. The blackening processing system still further comprises a matching process section 45 for carrying out the matching of the radiation image and the template with respect to their orientations and positions in accordance with a control operation of the processing control section 41 and thereby defining the irradiation field. The blackening processing system also comprises an automatic recognition section 48 for carrying out the automatic recognition of the irradiation field on the radiation image in accordance with an control operation of the processing control section 41. The blackening processing system further comprises a coordinate information processing section 46 for obtaining contour coordinate values of the irradiation field on the radiation image having been determined through the matching processing or the automatic recognition processing. The blackening processing system still further comprises a blackening process means 47 for carrying out the blackening process for the region outside of the irradiation field on the radiation image in accordance with the processing instructions, which are specified by the user in accordance with the matching results displayed on the image display device 42.

How the processing is carried out in the blackening processing system will be described hereinbelow in the order of i through x shown in FIG. 4. In FIG. 4, i through v indicate the flow of the template forming process, and vi through x indicate the flow of the template processing (i.e., the matching and the blackening process).

i. A radiation image has been recorded previously without an object lying at the position for image recording and by utilizing a collimation plate, which is used when an image of a predetermined portion of an object is to be recorded. An image signal representing the thus recorded radiation image is normalized under normalizing conditions Max 1.0 (or Max 2.0), which have been set such that the image signal may be expressed with a signal value range of one order of ten (or two orders of ten) in terms of latitude from the maximum signal value (the maximum picture element value). The image signal St for template is obtained from the normalization. The image signal St for template is fed into the processing control section 41.

ii. In the processing control section 41, a judgment is made as to the kind of processing, which is to be carried out on the image, in accordance with the image kind information appended to the image. In accordance with the kind of the processing to be carried out, it is determined whether the signal should be passed through the matching process section 45, the automatic recognition section 48, or the passage of "ii." As for the image signal St for template, it is passed through the passage of "ii" and fed into the image display device 42.

iii. An image for template is reproduced from the image signal St for template and displayed on the preview display screen 42 of the work station (QA-W/S). On the preview display screen 42, the user specifies a template forming instruction in order to form the template. At this time, the user calls the template forming section 43 and specifies the template forming instruction. At the same time, the user specifies a file for storing the template, which is formed by the template forming section 43. Also, the user registers a call menu number.

iv. In the template forming section 43, the size of the image is reduced such that the processing can be carried out quickly. (The image size reduction need not necessarily be carried out.) Binarization processing is then carried out on the image. For example, with the binarization processing, as for image density value corresponding to each of picture elements in the image, an image density value larger than a threshold value may be converted to a value of 1, and an image density value smaller than the threshold value may be converted to a value of 0. Thereafter, the irradiation field recognition processing for detecting the irradiation field contour is carried out on the binarized image. The irradiation field recognition processing may be carried out in any way. For example, a change in image density may be found along a radial line extending from the center point of the image, and a portion (an edge), at which the difference in image density with respect to an adjacent picture element is equal to at least a predetermined value, may thereby be detected. Alternatively, a technique for tracing a side of a binarized region may be employed.

v. The irradiation field contour having been recognized is stored as the template information in the template information storing section 44. The template information may be the information, which represents the template image itself serving as the mask image, or the information, which represents the positions of vertexes of a polygon constituting the mask region. Alternatively, instead of the template information being recognized automatically, the user may directly specify the contour by scanning a pointer on the display screen by use of a mouse device, or the like, and the template information may thereby be formed and stored.

vi. The image signal, which represents the radiation image to be subjected to the blackening process, and the image kind information including the information concerning the irradiation field shape are fed into the processing control section 41.

vii. In the processing control section 41, a judgment is made as to the kind of processing, which is to be carried out on the image, in accordance with the image kind information appended to the image. In accordance with the kind of the processing to be carried out, it is determined whether the signal should be passed through the matching process section 45, the automatic recognition section 48, or the passage of "ii." For example, in cases where it has been judged that the given image is the one, which is to be subjected to the blackening process and whose irradiation field can be defined by utilizing the template information stored in the template information storing section 44 as in the cases of a mamma image, the information representing the template, which corresponds to the collimation plate used in the operation for recording the image, is read from the template information storing section 44.

viii. The processing control section 41 feeds the template information, which has thus been read from the 44, and the image signal into the matching process section 45.

ix. The matching process section 45 carries out the matching of the template image and the radiation image with each other, makes a correction of the positions and orientations of the template image and the radiation image, and thereby defines the irradiation field on the radiation image. The information representing the defined irradiation field is fed into the coordinate information processing section 46.

x. The coordinate information processing section 46 calculates the coordinate values of the contour of the irradiation field on the radiation image. As a result of the calculation, the radiation image, on which irradiation field contour points have been illustrated, is obtained. The radiation image, on which the irradiation field contour points have been illustrated, is displayed on the display screen 42. After the irradiation field contour on the display screen 42 has been confirmed by the user, the image signal is fed into the blackening process means 47, and the blackening process is carried out on the region outside of the irradiation field on the radiation image.

In this blackening processing system, in cases where an image signal representing an image to be processed, for which the template information having been stored in the template information storing section 44 cannot be utilized, is given, for example, the automatic recognition of the irradiation field shape is carried out by the automatic recognition section 48, or the irradiation field shape is specified on the display screen by the user. Thereafter, the blackening process is carried out.

In the first, second, and third embodiments described above, the positions of the template and the image to be processed are corrected by the matching process. Alternatively, a template, which defines an irradiation field slightly broader than the actual irradiation field, may be prepared, and the radiation image and the template image may be merely overlapped upon each other. In this manner, instead of the matching process being carried out, the template may be utilized as a mask image, and the region outside of the irradiation field may thereby be blackened. In cases where the template, which defines an irradiation field slightly broader than the actual irradiation field, is thus utilized, even if a slight deviation in position occurs between the radiation image and the template image, the problems can be prevented from occurring in that the side within the actual irradiation field is blackened.

As another alternative, templates having the same shape and different sizes may be prepared, and the information concerning the irradiation field shape and the information concerning the size may be inputted or recognized. In this manner, a template having an appropriate size may be selected. As a further alternative, as the template having the same shape, only one template may be prepared. The size of the template may be enlarged or reduced in accordance with information concerning the shape, and the matching with the irradiation field on the radiation image to be processed may thereby be carried out.

Fourth, fifth, and sixth embodiments of the blackening processing apparatus in accordance with the present invention will be described hereinbelow.

FIG. 5 is a block diagram showing a fourth embodiment of the apparatus for blackening processing for a region outside of an irradiation field in accordance with the present invention. FIG. 6A is a schematic view showing a radiation image recording apparatus, in which a collimation plate is utilized. FIG. 6B is a schematic view showing a stimulable phosphor sheet, on which a radiation image has been recorded by use of the collimation plate and an irradiation field contour corresponding to an aperture contour of the collimation plate has been formed.

A radiation image, which may be subjected to a blackening process for a region outside of an irradiation field carried out in a blackening processing apparatus 110 shown in FIG. 5, may be obtained in the manner described below. Specifically, as illustrated in FIG. 6A, a collimation plate is located between an X-ray source and an object. The collimation plate has a rectangular aperture contour, and its portion outward from the aperture is constituted of a lead plate, which blocks X-rays from impinging upon portions of the object and portions of a stimulable phosphor sheet. In this condition, X-rays are produced by the X-ray source and irradiated to the object. The X-rays pass through the object and then impinge upon the stimulable phosphor sheet. At this time, as illustrated in FIG. 6B, the X-rays do not impinge upon a region Pout on the stimulable phosphor sheet (i.e., a region Pout outside of the irradiation field), which region corresponds to the side outward from the aperture contour of the collimation plate. An X-ray image of the object is recorded in a region (i.e., the irradiation field) Pin on the stimulable phosphor sheet, which region corresponds to the side inward from the aperture contour of the collimation plate. Also, at the portion of the stimulable phosphor sheet, which portion corresponds to the aperture contour of the collimation plate, an irradiation field contour PS is formed. (The irradiation field contour will often be referred to also as the irradiation field.) The irradiation field contour PS has a (rectangular) shape approximately identical with the shape of the aperture contour of the collimation plate and is constituted of a plurality of edge lines, at which the image density changes sharply.

In the manner described above, a radiation image (hereinbelow referred to as the original image) P is stored on the stimulable phosphor sheet. The stimulable phosphor sheet, on which the original image P has been stored, is fed into a radiation image read-out apparatus (not shown), which may be of the known type. In the radiation image read-out apparatus, the original image P is read out from the stimulable phosphor sheet, and a digital image signal So representing the original image P is thereby obtained. The image signal SO is fed into the blackening processing apparatus 110 shown in FIG. 5.

The blackening processing apparatus 110 carries out a blackening process for a region outside of an irradiation field (in a strict sense, for a blackening process region) on the radiation image, which has been recorded by use of the collimation plate in the manner described above. The blackening processing apparatus 110 comprises a blackening process region determining means 120 for determining a region (a blackening process region) PS1, for which the blackening process is to be carried out, in accordance with one of at least two different recognition techniques for recognizing a region outside of an irradiation field, which have been set such that one of them can be selected. The blackening processing apparatus 110 also comprises an image recording menu information input means 130 for inputting image recording menu information, which represents an image recording menu employed in an image recording operation. The blackening processing apparatus 110 further comprises a control means 140 for causing the blackening process region determining means 120 to select one of at least two different recognition techniques in accordance with the image recording menu information inputted from the image recording menu information input means 130. An image signal S1, which contains coordinate information representing the blackening process region PS1 having been determined by the blackening process region determining means 120, is fed into a blackening process means 150.

The image recording menu information input means 130 receives image recording menu information M, which represents an image recording menu. The image recording menu represents the portion of an object the image of which is recorded, the orientation in which the object lies when the image of the object is recorded, the image recording mode, the image recording apparatus, the irradiation field shape, the age of the object, and the like. The image recording menu information M may be inputted as header information (attendant information) appended to the image signal So. Alternatively, the image recording menu information M may be inputted as information independent of the image signal SO. The image recording menu information M is fed from the image recording menu information input means 130 into an automatic recognition section 122 and a template recognition section 124 of the blackening process region determining means 120 and into the control means 140.

In accordance with the received image recording menu information M, the control means 140 makes a judgment as to which one of at least two different recognition techniques is appropriate for the processing. The control means 140 causes the blackening process region determining means 120 to select the recognition technique, which has been judged as being appropriate for the processing.

As sections for carrying out two different recognition techniques, the blackening process region determining means 120 comprises the automatic recognition section 122, which carries out an automatic recognition technique for recognizing the region outside of the irradiation field in accordance with the received image signal SO, and the template recognition section 124, which carries out a template recognition technique for recognizing the region outside of the irradiation field in accordance with template information T corresponding to the collimation plate. The blackening process region determining means 120 also comprises a coordinate process section 126 for outputting coordinate information, which represents the determined blackening process region PS1. The automatic recognition section 122 and the template recognition section 124 recognize the region outside of the irradiation field by utilizing the image recording menu information M. At least two different recognition techniques which can be selected are not limited to the automatic recognition technique and the template recognition technique, other kinds of recognition techniques may be employed.

As indicated by X in FIG. 5, the blackening process region determining means 120 may be constituted such that, besides the two recognition techniques described above, a technique for recognizing the absence of a region outside of an irradiation field can also be selected. In such cases, when the technique for recognizing the absence of a region outside of an irradiation field is selected, the blackening process region determining means 120 should preferably output, as the coordinate values, which represent the determined blackening process region PS1, the coordinate values such that the side outward from the coordinate region representing the image signal SO may be set as the blackening process region.

As the automatic recognition technique carried out by the automatic recognition section 122, it is possible to employ the processing, in which edge candidate points in an image are detected in accordance with differences between image signal values, or the like, and an edge line is obtained in accordance with the detected edge candidate points. Such processing is proposed in, for example, U.S. Pat. No. 4,967,079. It is also possible to employ any of other known types of irradiation field recognition processing, such as dynamic contour extraction processing, in which snakes algorithms, and the like, are utilized, and contour extraction processing, in which Hough transform is utilized.

Figure 7:
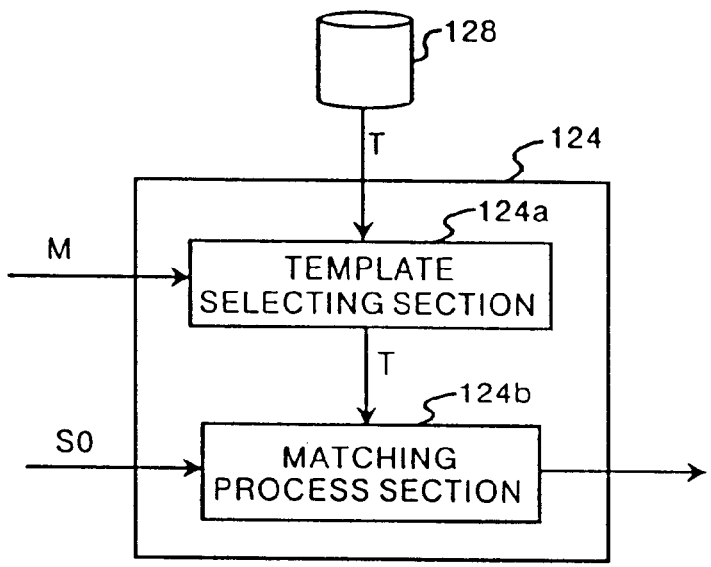
FIG. 7 is a block diagram showing a template recognition section.

FIG. 7 is a block diagram showing the constitution of the template recognition section 124. The template recognition section 124 comprises a template selecting section 124a and a matching process section 124b. The template selecting section 124a utilizes the image recording menu information M received from the image recording menu information input means 130 and selects template information T, which corresponds to the collimation plate used in the operation for recording the radiation image, i.e. which corresponds to the irradiation field shape on the radiation image, from a template information storing means 128. The matching process section 124b receives the image signal SO, which represents the given radiation image, and the template information T, which has been selected by the template selecting section 124a. The matching process section 124b carries out the matching of the template image, which is represented by the template information T, and the radiation image, which is represented by the image signal SO, with each other with respect to the orientations (or inclinations) and the positions of the template image and the radiation image. The matching process section 124b thereby recognizes a region PSO outside of the irradiation field. The template information storing means 128 stores a plurality of pieces of template information corresponding to various collimation plates, i.e. various irradiation field shapes.

Ordinarily, the collimation plate used in the radiation image recording operation is specified in accordance with the image recording menu in the radiation image recording operation, such as the portion of the object the image of which is recorded. The shape of the irradiation field on the radiation image is determined by the shape of the collimation plate. Therefore, by the utilization of the image recording menu information M, the template information T corresponding to the received image signal SO can be selected. Also, an appropriate matching process can be carried out by using the selected template information T, and the region PO outside of the irradiation field can thereby be recognized accurately.

In cases where the image recording menu information M is not utilized, or in cases where the image recording menu information M is utilized but the template information corresponding to the image signal SO cannot be narrowed down to a single piece of template information, the template recognition section 124 may carry out the matching of the image signal SO with each of all pieces of template information or candidate pieces of template information stored in the template information storing means 128. A piece of template information, which has the highest degree of matching, may then be selected as the template information corresponding to the irradiation field on the image to be processed.

In cases where only the radiation images having been recorded by using a predetermined collimation plate are to be processed as in a blackening processing apparatus provided in a mamma image recording apparatus, it is sufficient for only one piece of template information to be provided. In such cases, the template selecting section 124a is unnecessary, and the matching process may be carried out by utilizing the only one piece of template information.

Also, in cases where the image recording operations are carried out such that the positions and the inclinations of the objects and the irradiation field shapes may be kept the same, template information, which defines an irradiation field slightly broader than the actual irradiation field, may be prepared. Instead of the matching of the template image, which is represented by the template information T, and the image, which is represented by the image signal SO, with each other being carried out, the region PSO outside of the irradiation field may then be defined from the collimation plate shape itself, which is represented by the template information T. In cases where the template information, which defines an irradiation field slightly broader than the actual irradiation field, is thus utilized, even if a slight deviation in position occurs between the radiation image and the template image, the problems can be prevented from occurring in that the side within the actual irradiation field is blackened.

As another alternative, pieces of template information, which represent templates having the same shape and different sizes, may be prepared, and the information concerning the irradiation field shape and the information concerning the size may be inputted or recognized. In this manner, a piece of template information, which represents a template having an appropriate size, may be selected. As a further alternative, as the template having the same shape, only one template may be prepared. The size of the template may be enlarged or reduced in accordance with information concerning the shape, and the matching with the irradiation field on the radiation image to be processed may thereby be carried out.

The coordinate process section 126 shown in FIG. 5 determines the region to be subjected to the blackening process, i.e. the blackening process region PS1, in accordance with the region PSO outside of the irradiation field, which region has been recognized with the recognition process carried out by the automatic recognition section 122 or the template recognition section 124. The coordinate process section 126 feeds the coordinate information (coordinate values), which represents the blackening process region PS1, into the blackening process means 150. In the determination of the blackening process region PS1, the recognized region PSO outside of the irradiation field may be determined directly as the blackening process region PS1. Alternatively, in accordance with the recognition technique employed, a region, which is slightly larger or smaller than the recognized region PSO outside of the irradiation field, may be determined as the blackening process region PS1.

Figure 8:
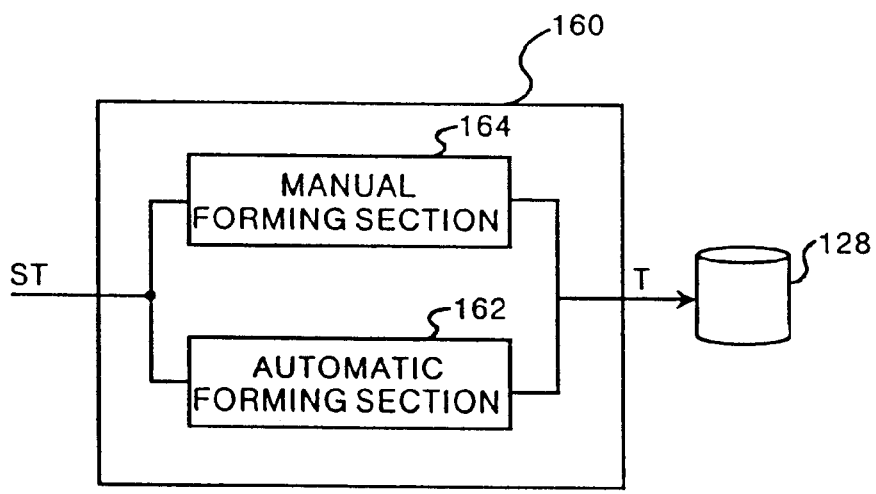
FIG. 8 is a block diagram showing a template information forming section.

FIG. 8 shows a template information forming section 160, which is utilized for storing the template information T in the template information storing means 128. The blackening processing apparatus in accordance with the present invention should preferably be provided with the template information forming section 160. (Such a constitution will be described later with reference to FIG. 13.)

As illustrated in FIG. 8, the template information forming section 160 comprises an automatic forming section 162 and a manual forming section 164, which can be selectively changed over to each other. The automatic forming section 162 automatically forms the template information T in accordance with an image signal ST for template formation. The manual forming section 164 is used to manually form the template information T by using a user interface.

The automatic forming section 162 carries out irradiation field recognition processing for detecting the irradiation field contour in accordance with the image signal ST for template formation. Specifically, a radiation image, which has been recorded without an object lying at the position for image recording and by utilizing a collimation plate that is used when an image of a predetermined portion of an object is to be recorded, is prepared. An image signal ST representing the thus recorded radiation image is then binarized, and the detection of the irradiation field contour is carried out with respect to the binarized image signal. The detection of the irradiation field contour may be carried out in one of various ways. For example, a change in image density may be found along a radial line extending from the center point of the image, and a portion (an edge), at which the difference in image density with respect to an adjacent picture element is equal to at least a predetermined value, may thereby be detected. Alternatively, a technique for tracing a side of a binarized region may be employed. Instead of the radiation image, which has been recorded without an object lying at the position of image recording, being used, the detection of the irradiation field contour may also be carried out on a radiation image, in which an object pattern is embedded, by using the aforesaid automatic recognition technique.

In the manual forming section 164, the template information T is formed by manual operations of the operator. Specifically, with the manual forming technique, the user may directly specify the contour by scanning a pointer on a display screen by use of a mouse device, or the like, and the template information T may thereby be formed. In such cases, known drawing software functions, which are ordinarily used in personal computers, may be utilized.

The template information T, which has been formed by the template information forming section 160, is stored in the template information storing means 128 and utilized in the template recognition section 124 of the blackening process region determining means 120 in the manner described above.

The blackening process means 150 shown in FIG. 5 carries out the blackening process in accordance with the image signal S1, which contains the coordinate information representing the blackening process region PS1 and having been received from the coordinate process section 126. Specifically, the blackening process is carried out with respect to the region outside of the irradiation field Pin on the radiation image P1, which is represented by the image signal S1. (In a strict sense, the blackening process is carried out with respect to the blackening process region PS1.) With the blackening process, for example, the image signal values may be uniformly converted into the highest level of image density (in the cases of the image reproduced on photographic film), or may be uniformly converted into the lowest level of luminance (in the cases of the image displayed on a CRT display device).

As the blackening process carried out by the blackening process means 150, it is possible to employ one of various processes for yielding glare preventing effects, which are carried out such that a reproduced visible radiation image can be prevented from becoming hard to see due to strong light coming from the region outside of the irradiation field on the visible image and entering the eyes of the person, who sees the visible image, when the visible image is seen, and such that the person, who sees the visible image, can be prevented from becoming fatigued. The blackening process is not limited to the uniform conversion of the image signal values into the highest level of image density or the lowest level of luminance. By way of example, as the blackening process, it is possible to employ one of various other processes, such as processing for converting image signal values, which represent picture elements located in a region outside of an irradiation field, into image density values such that the image density values may become large from a contour of an irradiation field toward ends of the radiation image, and processing for adding a predetermined value to the original image signal values, which represent picture elements located in a region outside of an irradiation field.

The blackening processing apparatus in accordance with the present invention should preferably be constituted such that, in cases where the blackening process region, which has been determined by the blackening process region determining means 120, is not a correct one, the determined blackening process region can be corrected. Specifically, the blackening processing apparatus in accordance with the present invention should preferably be provided with a displaying means, such as a CRT display device, for displaying the blackening process region PS1, which has been determined by the blackening process region determining means 120, as a visible image, and a blackening process region correcting means for correcting the blackening process region PS1, which is displayed on the displaying means.

Figure 9:
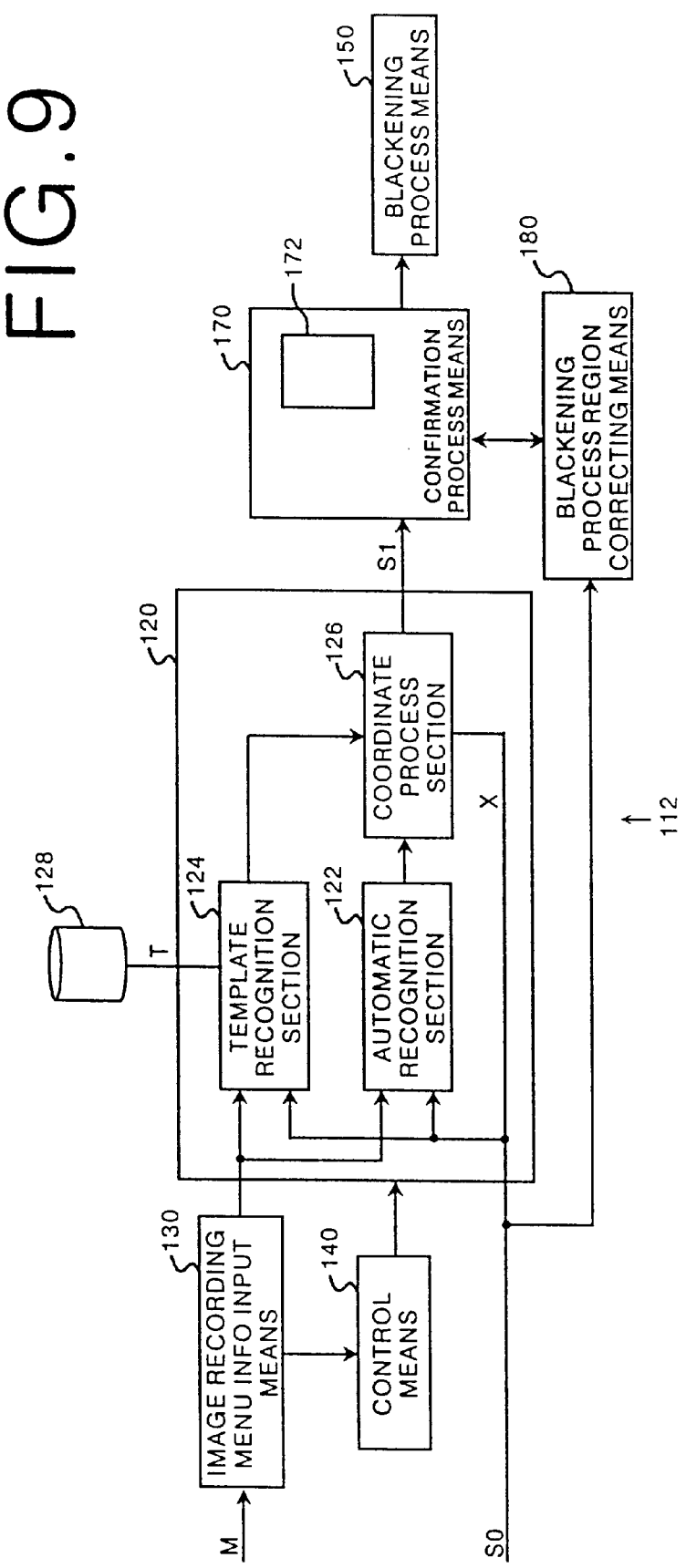
FIG. 9 is a block diagram showing a fifth embodiment of the apparatus for blackening processing for a region outside of an irradiation field in accordance with the present invention, which is provided with a displaying means and a blackening process region correcting means.

FIG. 9 is a block diagram showing a blackening processing apparatus 112, which is a fifth embodiment of the apparatus for blackening processing for a region outside of an irradiation field in accordance with the present invention. The fifth embodiment is the same as the blackening processing apparatus 110 shown in FIG. 5, except that a displaying means and a blackening process region correcting means are further provided.

In the blackening processing apparatus 112, a confirmation process means 170, which contains a displaying means 172, is located between the blackening process region determining means 120 and the blackening process means 150. A blackening process region correcting means 180 is connected to the confirmation process means 170.

The displaying means 172 may be constituted of one of various means, with which the blackening process region PS1 having been determined by the blackening process region determining means 120 can be confirmed as a visible image. By way of example, the displaying means 172 may display the entire area of the blackening process region or may display only the contour of the determined blackening process region. In such cases, the entire area or the contour of the blackening process region should preferably be displayed by being overlapped upon the image, which is represented by the image signal So.

Figure 10:
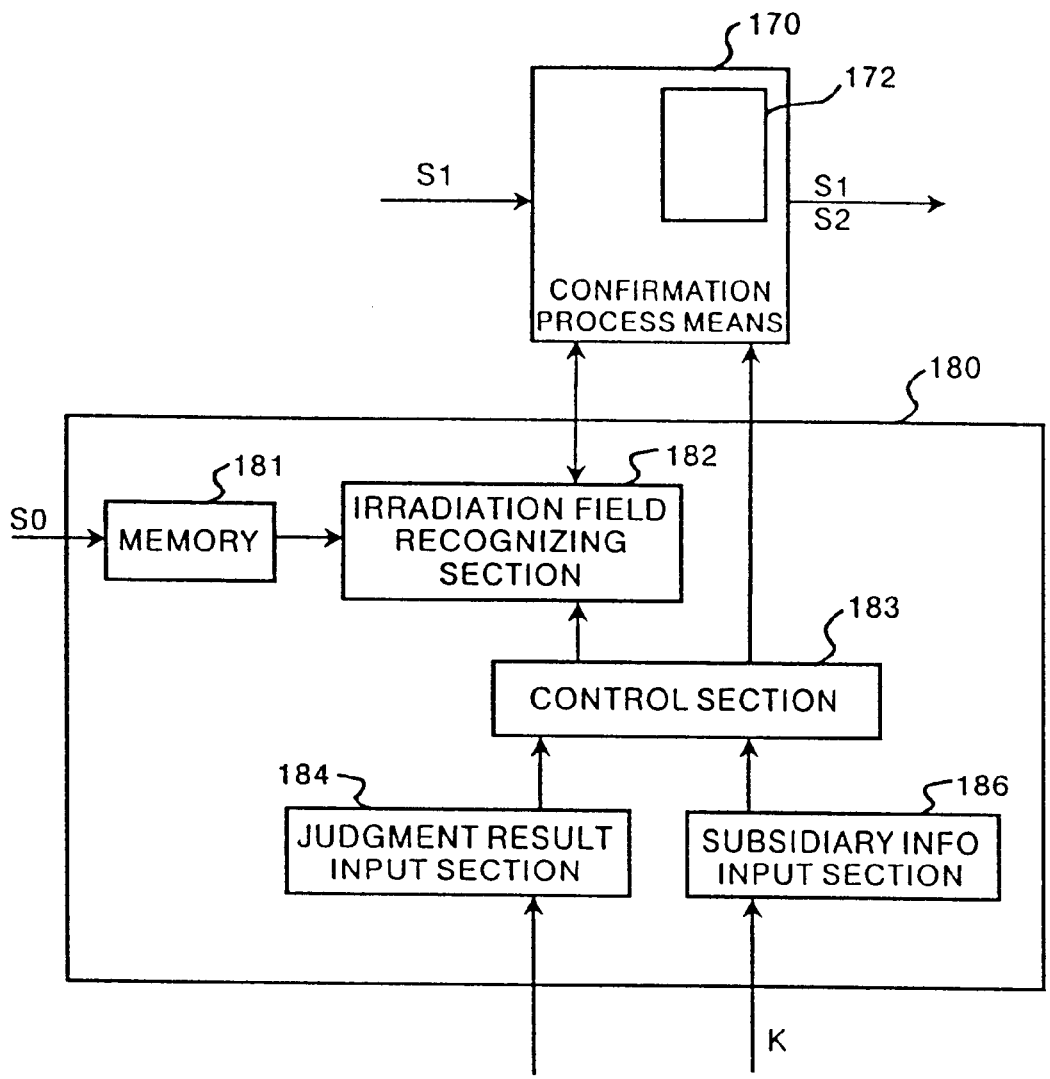
FIG. 10 is a block diagram showing the blackening process region correcting means.

FIG. 10 is a block diagram showing the blackening process region correcting means 180. The blackening process region correcting means 180 comprises a memory 181 for storing the received image signal SO, and a subsidiary information input section 186 for inputting predetermined subsidiary information K. The blackening process region correcting means 180 also comprises an irradiation field recognizing section 182 for carrying out the automatic recognition of the irradiation field on the image signal SO by using recognition processing conditions, which conform to the predetermined subsidiary information K having been inputted from the subsidiary information input section 186, as preconditions. The blackening process region correcting means 180 further comprises a judgment result input section 184, which receives information representing whether the blackening process region PS1 having been determined by the blackening process region determining means 120 described above is or is not appropriate. The blackening process region correcting means 180 still further comprises a control section 183. In cases where the information, which represents that the determined blackening process region PS1 is appropriate, has been inputted into the judgment result input section 184, the control section 183 causes the confirmation process means 170 to feed the image signal S1, which contains the coordinate information (coordinate values) representing the blackening process region PS1, directly into the blackening process means 150. In cases where the information, which represents that the determined blackening process region PS1 is not appropriate, has been inputted into the judgment result input section 184, the control section 183 causes the confirmation process means 170 to feed information, which represents a blackening process region PS2 having been determined in accordance with an irradiation field recognized by the irradiation field recognizing section 182, into the blackening process means 150.

The subsidiary information K fed into the subsidiary information input section 186 is the information useful for accurately carrying out the irradiation field recognizing process in the irradiation field recognizing section 182. By way of example, as illustrated in FIG. 11, the subsidiary information K may represent: (a) the kind of a subdivision pattern, which represents the arrangement of a plurality of irradiation fields in cases where the plurality of the irradiation fields are present in the radiation image, (b) the kind of the irradiation field pattern, which represents the shape of the irradiation field contour, (c) the position of a point in each irradiation field (e.g., the center point of each irradiation field), and/or (d) the presence or absence of an irradiation field on the radiation image. The subsidiary information K is not limited to the above-enumerated four kinds of information. For example, as the subsidiary information K, information representing the positions of four vertexes of a rectangular irradiation field may be inputted by using a mouse device, or the like.

In the subsidiary information input section 186, as illustrated in FIG. 11, a subsidiary information input menu is displayed such that one kind of information can be selected or at least two kinds of information can be selected simultaneously as the subsidiary information K. On the display screen, the selection items can be specified easily by using a mouse device, cursor keys, a touch pen, or the like.

The irradiation field recognizing section 182 may operate in one of various ways such that the irradiation field recognizing process can be carried out under the preconditions in accordance with the subsidiary information K having been inputted into the subsidiary information input section 186. Specifically, the irradiation field recognizing section 182 may be constituted such that one of various automatic recognition processes in accordance with the subsidiary information K can be carried out. For example, in cases where the subsidiary information K, which represents that the irradiation field pattern has a circular shape, is inputted, the irradiation field recognizing process may be carried out such that an approximately circular irradiation field pattern may be obtained. Alternatively, as proposed in, for example, Japanese Unexamined Patent Publication No. 10(1998)-154226, information (e.g., coordinate values) concerning the irradiation field contour may be successively inputted with a mouse device, or the like, and a new contour line may be formed by connecting the inputted information points.

How the blackening processing apparatus 112 shown in FIG. 9 operates will be described hereinbelow. Firstly, the image signal SO, which represents the radiation image having been recorded in the manner shown in FIG. 6, is fed into the blackening process region determining means 120. Also, the image recording menu information M, which represents the image recording menu in the image recording operation, is fed into the image recording menu information input means 130. The image signal SO is also fed into and stored in the memory 181 of the blackening process region correcting means 180.

The image recording menu information input means 130 feeds the image recording menu information M into the automatic recognition section 122 and the template recognition section 124 of the blackening process region determining means 120. The image recording menu information M is also fed into the control means 140.

In accordance with the image recording menu information M, the control means 140 makes a judgment as to whether the automatic recognition section 122 should be employed or the template recognition section 124 should be employed for the irradiation field recognition when the blackening process region is to be determined. The control means 140 also makes a judgment as to whether the irradiation field recognizing processes carried out by the automatic recognition section 122 and the template recognition section 124 are or are not appropriate for the image, or whether the region outside of the irradiation field should be or should not be regarded as being absent. In accordance with the results of the judgment, the control means 140 causes the blackening process region determining means 120 to select the automatic recognition section 122, the template recognition section 124, or the route X (in cases where the absence of the region outside of the irradiation field is recognized).

For example, in cases where it has been judged that the given image is the one, whose region outside of the irradiation field can be recognized by utilizing the template information T stored in the template information storing means 128 as in the cases of a mamma image, the control means 140 causes the blackening process region determining means 120 to select the template recognition section 124. The template recognition section 124 reads the template information T, which corresponds to the collimation plate used in the image recording operation, from the template information storing means 128. Also, the template recognition section 124 carries out the matching of the template image, which is represented by the template information T, and the image, which is represented by the image signal SO, with each other and thereby corrects the positions and orientations of the two images. In this manner, the template recognition section 124 recognizes the region outside of the irradiation field on the radiation image and feeds the information, which represents the recognized region outside of the irradiation field, into the coordinate process section 126.

In cases where it has been judged that the image is the one, whose region outside of the irradiation field can be recognized automatically, the control means 140 causes the blackening process region determining means 120 to select the automatic recognition section 122. The automatic recognition section 122 carries out the automatic recognition of the region outside of the irradiation field in accordance with the image signal SO and by utilizing the image recording menu information M. The information, which represents the recognized region outside of the irradiation field, is fed into the coordinate process section 126.

In cases where it has been judged that the region outside of the irradiation field should be regarded as being absent, the control means 140 causes the blackening process region determining means 120 to select the route X shown in FIG. 9, such that the automatic recognition section 122 and the template recognition section 124 may not be utilized.

The coordinate process section 126 determines the blackening process region PS1 on the radiation image in accordance with the region Pout outside of the irradiation field, which region has been recognized by the automatic recognition section 122 or the template recognition section 124. (Specifically, the region Pout outside of the irradiation field is given as the coordinate information representing the contour of the irradiation field.) The coordinate information, which represents the blackening process region PS1, the image signal S1, which contains the image signal SO representing the original image, are fed into the confirmation process means 170.

Specifically, as the confirmation process means 170, the work station (QA-W/S) is utilized. The confirmation process means 170 is provided with the displaying means 172. The radiation image, in which contour points of the blackening process region PS1 have been illustrated, is displayed as a preview screen on the displaying means 172.

The person, such as a medical doctor, who sees the displayed image, makes a judgment as to whether the the blackening process region PS1 displayed on the displaying means 172 is or is not appropriate with respect to the actual region Pout outside of the irradiation field, which region is located in the radiation image P. Specifically, the judgment is made as to whether the the blackening process region PS1 having been determined by the blackening process region determining means 120 approximately coincides with or does not coincide with the actual region Pout outside of the irradiation field. The information representing the results of the judgment is fed by the person, who sees the displayed image, into the judgment result input section 184 shown in FIG. 10. In cases where the determined blackening process region PS1 has been judged by the person, who sees the displayed image, as being appropriate, "OK" is specified. In cases where the determined blackening process region PS1 has been judged by the person, who sees the displayed image, as being not appropriate, "Not OK" is specified.

The information representing the results of the judgment is then fed from the judgment result input section 184 into the control section 183. The control section 183 carries out control operations varying in accordance with the results of the judgment.

Specifically, in cases where "OK" is specified as the results of the judgment, the control section 183 causes the confirmation process means 170 to directly feed the image signal S1, which contains the coordinate values representing the blackening process region PS1, into the blackening process means 150. In accordance with the received image signal S1, which contains the coordinate values representing the blackening process region PS1, the blackening process means 150 carries out the blackening process for the blackening process region PS1 on the radiation image represented by the image signal S1. By way of example, with the blackening process, the image signal values corresponding to the blackening process region PS1 may be uniformly converted into the highest level of image density or the lowest level of luminance. In this manner, a blackening-processed image suitable for use in making a diagnosis, or the like, can be obtained.

In cases where the blackening process region determining means 120 selects the technique for recognizing the absence of a region outside of an irradiation field, the coordinate process section 126 outputs, as the coordinate values representing the blackening process region PS1, the coordinate values such that the side outward from the coordinate region representing the image signal SO may be set as the blackening process region. Therefore, even if the blackening process means 150 carries out the blackening process described above, no blackening process will actually occur.

In cases where "Not OK" is specified as the results of the judgment, since the blackening process region PS1 having been determined by the blackening process region determining means 120 is the one inappropriate for use in the subsequent blackening process, it is necessary for a correction to be made. Therefore, in such cases, the control section 183 waits for the input of the subsidiary information K (as shown in FIG. 11) into the subsidiary information input section 186 by the person, who sees the displayed image.

By way of example, in cases where the item of "subdivision pattern" is selected in the subsidiary information input menu and "B (two-on-one horizontal)" is specified to the subsidiary information input section 186, processing is carried out in the manner described below. As an aid in facilitating the explanation, it is assumed herein that the item of "subdivision pattern" includes only "A" and "B" and does not include "C" shown in FIG. 11.

The information, which represents the item of "subdivision pattern" and the kind "B" of the subdivision pattern, is fed from the subsidiary information input section 186 into the control section 183. The control section 183 controls the irradiation field recognizing section 182 such that it may select the algorithm, which corresponds to the received information, from the algorithms for irradiation field recognizing processes in the irradiation field recognizing section 182. In this embodiment, an irradiation field recognizing process B is selected as the algorithm corresponding to the subdivision pattern "B."

Also, the control section 183 causes the irradiation field recognizing section 182 to fetch the image signal SO from the memory 181. The irradiation field recognizing section 182 carries out the recognition process in accordance with the selected algorithm (i.e., the irradiation field recognizing process B) and on the received image signal SO. Specifically, instead of the recognition process for detecting a single blackening process region PS1 on the entire area of the radiation image P being carried out as in the automatic recognition section 122, the radiation image P is divided approximately into two subdivisions standing side by side horizontally, and the recognition process is carried out for determining one blackening process region PS2 in each of the two subdivisions. A radiation image P2, which contains the thus determined two blackening process regions PS2, PS2, is displayed on the displaying means 172.

After the correction of the blackening process region has been made in the manner described above, the control section 183 waits for the input of the judgment result information carried out by the person, who sees the displayed image, as in the cases where the radiation image P1 containing the blackening process region PS1 was displayed on the displaying means 172. Thereafter, the same processing as that described above is repeated.

It is necessary to set what preconditions should be set for a third recognition process in cases where "Not OK" is specified as the results of the judgment made after the correction of the blackening process region. The control section 183 may operate in accordance with the setting of the preconditions for the third recognition process. Specifically, the preconditions for the third recognition process may be set as conditions (AND conditions), which simultaneously satisfy the subsidiary information (the subdivision pattern "B") specified for the second recognition process (the correction described above) and additional subsidiary information (e.g., an irradiation field pattern "e") specified for the third recognition process to the subsidiary information input section 186. Alternatively, when each recognition process is finished, the previous preconditions may be canceled, and preconditions satisfying only the newly inputted subsidiary information (which can be selected from a plurality of pieces of subsidiary information) may be set. As another alternative, it may be set such that one piece or at least two pieces of subsidiary information, which are among the plurality of pieces of the previously inputted subsidiary information, can be selected.

As described above, with the fifth embodiment of FIG. 9, in cases where an appropriate blackening process region was not obtained as a result of the determination of the blackening process region carried out by the blackening process region determining means 120 (i.e., the first blackening process region determining processing), an irradiation field recognizing process is again carried out by taking the inputted subsidiary information as the preconditions, and the blackening process region is thereby corrected (in the second blackening process region determining processing). In this manner, an appropriate blackening process region can be obtained. The second blackening process region determining processing can be carried out with the simple operation for inputting the subsidiary information.

Figure 12A:
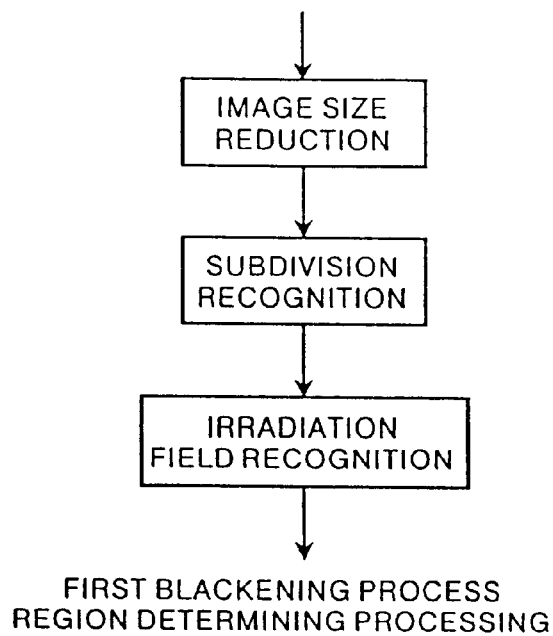
FIG. 12A is a flow chart showing a first blackening process region determining process.
Figure 12B:
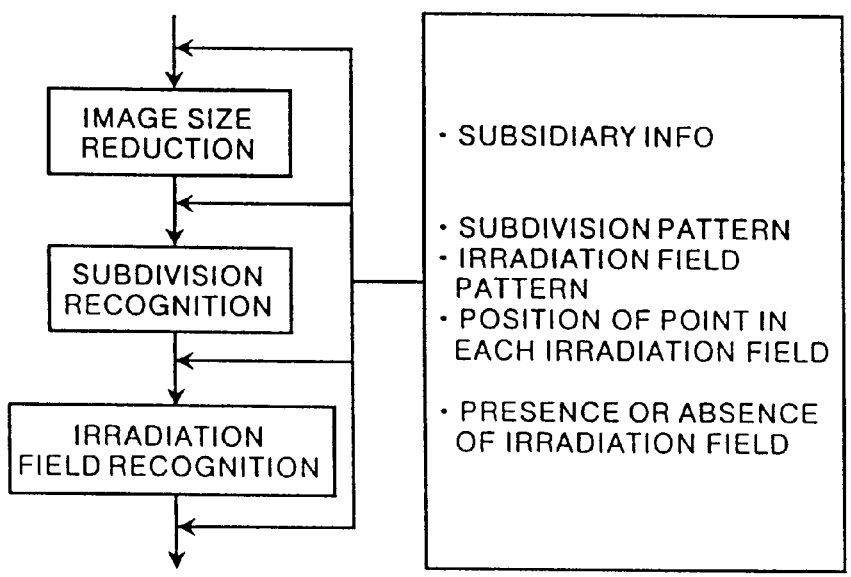
FIG. 12B is a flow chart sowing a second blackening process region determining process, in which algorithms of the first blackening process region determining process are utilized.

In the fifth embodiment described above, the first blackening process region determining processing and the second blackening process region determining processing are set as two independent processings. Alternatively, for example, as illustrated in FIG. 12A, in cases where the recognition process carried out by the aforesaid automatic recognition section 122 is composed of the image size reduction process for reducing the size of the radiation image, the subdivision recognition process for recognizing whether the reduced image has or does not have subdivisions, and the irradiation field recognizing process for each of the subdivisions recognized by the subdivision recognition process, the three processes being carried out in this order, the blackening process region determining means 120 may be caused to select the automatic recognition section 122 for carrying out the first blackening process region determining processing. Also, instead of the second blackening process region determining processing being carried out by the irradiation field recognizing section 182 as processing independent of the first blackening process region determining processing, the second blackening process region determining processing may be carried out by utilizing the automatic recognition section 122, i.e. by directly utilizing the first blackening process region determining processing. Specifically, as illustrated in FIG. 12B, in cases where the subdivision pattern is inputted as the subsidiary information, the image size reduction process and the subdivision recognition process in the first blackening process region determining processing may be omitted, and the irradiation field recognition in accordance with the inputted subsidiary information representing the subdivision pattern may be carried out as the second blackening process region determining processing. In the same manner, in cases where a different kind of subsidiary information is inputted, processing beginning with a process subsequent to the process, which corresponds to the inputted subsidiary information, in the first blackening process region determining processing may be set as the second blackening process region determining processing.

Figure 13:
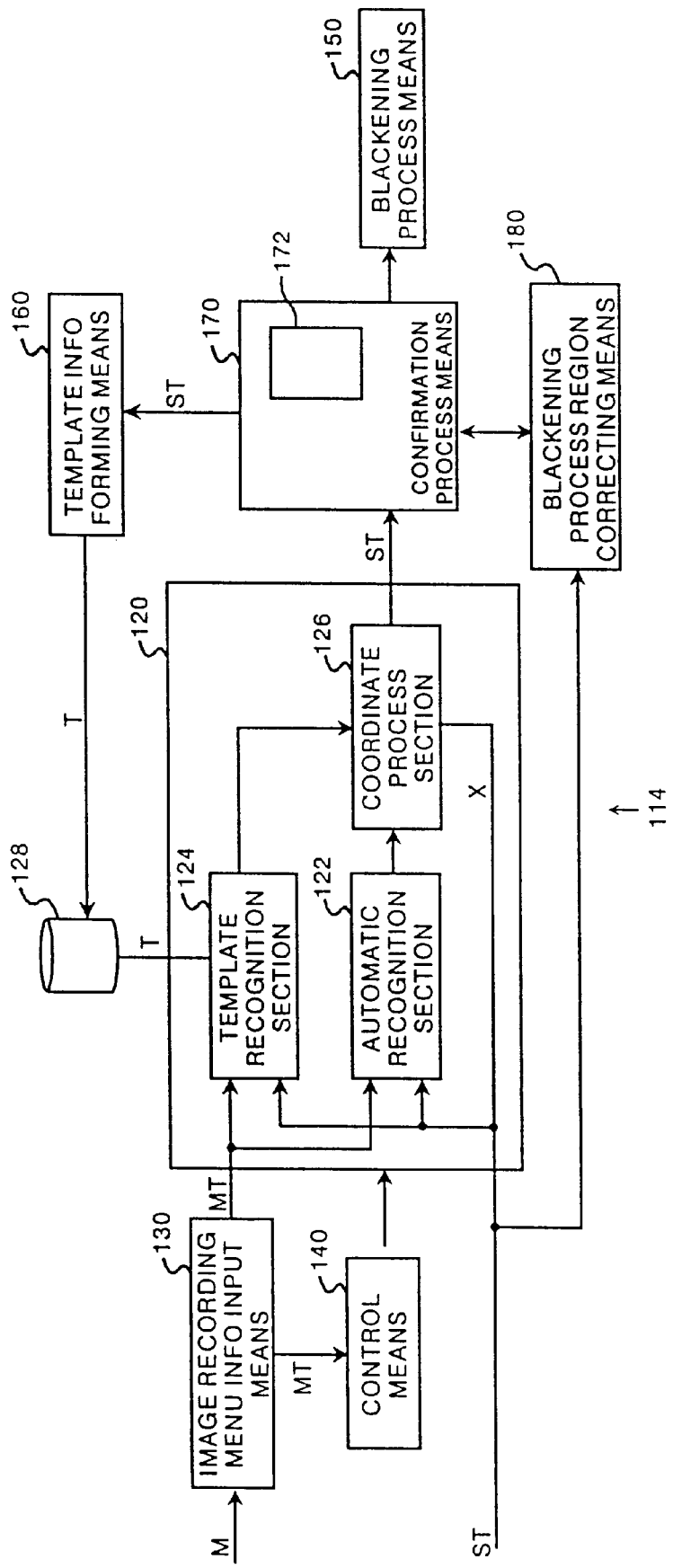
FIG. 13 is a block diagram showing a sixth embodiment of the apparatus for blackening processing for a region outside of an irradiation field in accordance with the present invention, which is provided with a template information forming section.

FIG. 13 shows a blackening processing apparatus 114, which is a sixth embodiment of the apparatus for blackening processing for a region outside of an irradiation field in accordance with the present invention. The sixth embodiment is the same as the blackening processing apparatus 112 shown in FIG. 9, except that the template information forming section 160 shown in FIG. 8, is further provided. How the sixth embodiment operates will be described hereinbelow.

As illustrated in FIG. 13, the template information forming section 160 is connected to the confirmation process means 170 described above. The template information T formed by the template information forming section 160 is stored in the template information storing means 128.

The processing flow of the blackening process in the sixth embodiment is the same as that described above with reference to FIG. 9. Therefore, only the template information forming process will be described hereinbelow.

A radiation image (an image for template) has been recorded previously without an object lying at the position for image recording and by utilizing a collimation plate, which is used when an image of a predetermined portion of an object is to be recorded. An image signal representing the thus recorded radiation image is normalized under normalizing conditions Max 1.0 (or Max 2.0), which have been set such that the image signal may be expressed with a signal value range of one order of ten (or two orders of ten) in terms of latitude from the maximum signal value (the maximum picture element value). The image signal ST for template is obtained from the normalization. The image signal ST for template is fed into the blackening process region determining means 120. Also, the image recording menu information MT, which represents that the inputted image signal is the image signal ST for template, is fed into the image recording menu information input means 130.

In accordance with the image recording menu information MT, the control means 140 causes the blackening process region determining means 120 to select the route X, i.e. the technique for recognizing the absence of a region outside of an irradiation field. The blackening process region determining means 120 outputs, as the coordinate values representing the blackening process region, the coordinate values such that the side outward from the coordinate region representing the image signal may be set as the blackening process region. Therefore, only the image for template, which is represented by the inputted image signal for template, is displayed on the displaying means 172.

The person, who sees the displayed image, specifies the template formation to the confirmation process means 170 with a key for forming the template. As a result, the confirmation process means 170 gives an instruction for template formation to the template information forming section 160. At this time, with the confirmation process means 170, the person, who sees the displayed image, specifies a file for storing the template information, which is formed by the template information forming section 160. Also, the person, who sees the displayed image, registers a call menu number.

In the automatic forming section 162 of the template information forming section 160, the size of the image is reduced such that the processing can be carried out quickly. (The image size reduction need not necessarily be carried out.) Binarization processing is then carried out on the image. For example, with the binarization processing, as for image density value corresponding to each of picture elements in the image, an image density value larger than a threshold value may be converted to a value of 1, and an image density value smaller than the threshold value may be converted to a value of 0. Thereafter, the irradiation field recognition processing for detecting the irradiation field contour is carried out on the binarized image. The irradiation field recognition processing may be carried out in any way. For example, a change in image density may be found along a radial line extending from the center point of the image, and a portion (an edge), at which the difference in image density with respect to an adjacent picture element is equal to at least a predetermined value, may thereby be detected. Alternatively, a technique for tracing a side of a binarized region may be employed.

The irradiation field contour, which has been recognized in the automatic forming section 162, is stored as the template information in the template information storing means 128. The template information may be the information, which represents the template image itself serving as the mask image, or the information, which represents the positions of vertexes of a polygon constituting the mask region. Alternatively, instead of the template information being formed automatically by the automatic forming section 162, the manual forming section 164 may be utilized, and the person, who sees the displayed image, may directly specify the contour by scanning a pointer on the display screen by use of a mouse device, or the like. In this manner, the template information may be formed and stored.

An embodiment of the template matching device in accordance with the present invention will be described hereinbelow.

Figure 14:
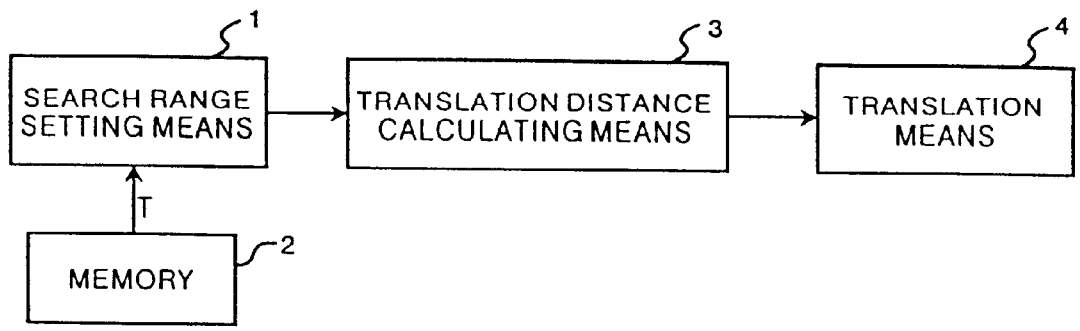
FIG. 14 is a block diagram showing an embodiment of the template matching device in accordance with the present invention.

FIG. 14 is a block diagram showing an embodiment of the template matching device in accordance with the present invention. The template matching device carries out matching of a mamma image shown in FIG. 15, which has been recorded by using a collimation plate having a semicircular shape, and a template shown in FIG. 16, which corresponds to the contour of the irradiation field formed on the mamma image, with each other. In this embodiment, the horizontal direction represents the horizontal direction in FIG. 15 and FIG. 16, and the vertical direction represents the vertical direction in FIG. 15 and FIG. 16. As illustrated in FIG. 14, the template matching device comprises a search range setting means 1, a memory 2 for storing template information T representing the template, a translation distance calculating means 3, and a translation means 4.

Figure 15:
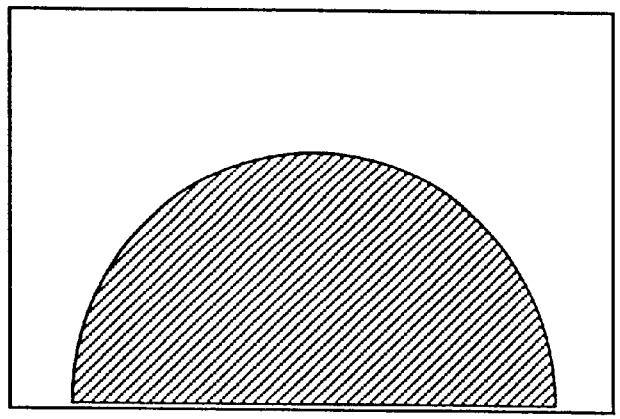
FIG. 15 is a schematic view showing a mamma image.
Figure 16:
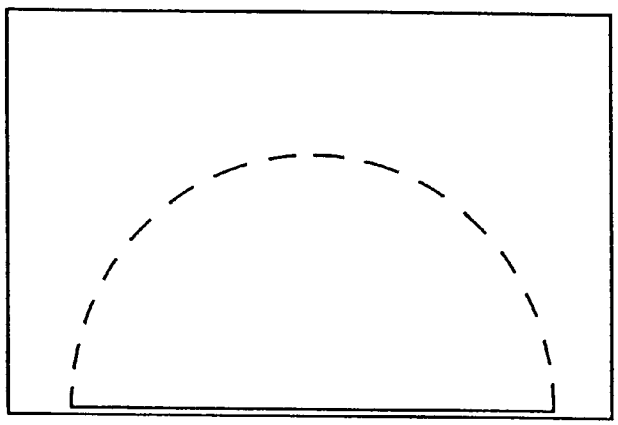
FIG. 16 is a schematic view showing a template.
Figure 17:
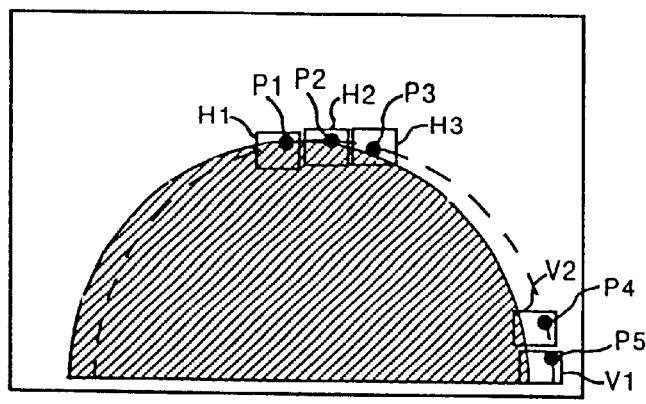
FIG. 17 is an explanatory view showing the mamma image and the template, which are overlapped upon each other.
Figure 18:
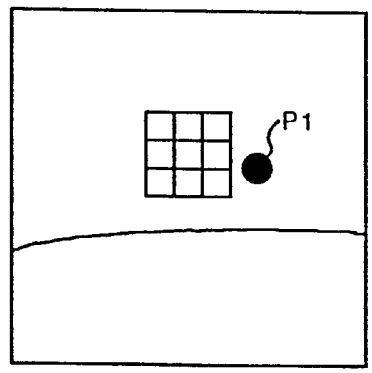
FIG. 18 is an explanatory view showing a horizontal search range.
Figure 19:
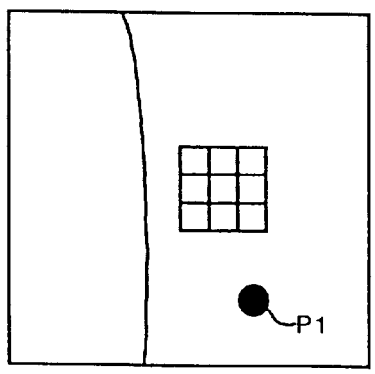
FIG. 19 is an explanatory view showing a vertical search range.

As illustrated in FIG. 17, when the mamma image shown in FIG. 15 and the template shown in FIG. 16 are overlapped one upon the other, the mamma image and the template deviate in position from each other. In this embodiment, horizontal coordinate points P1, P2, and P3, which correspond to horizontal line components of the irradiation field contour (lying along the horizontal direction in FIG. 17), are set previously on the contour line of the template. Also, vertical coordinate points P4 and P5, which correspond to vertical line components of the irradiation field contour (lying along the vertical direction in FIG. 17), are set previously on the contour line of the template. In the search range setting means 1, three horizontal search ranges H1, H2, and H3 are set on the mamma image such that they may respectively contain the horizontal coordinate points P1, P2, and P3. Also, two vertical search ranges V1 and V2 are set on the mamma image such that they may respectively contain the vertical coordinate points P4 and P5. As an aid in facilitating the explanation, in FIG. 17, the horizontal search ranges H1, H2, H3 and the vertical search ranges V1, V2 are illustrate to have comparatively large areas. However, actually, each of the horizontal search ranges H1, H2, and H3 is set in a very small range at the upper edge portion on the contour of the irradiation field on the mamma image. Also, each of the vertical search ranges V1 and V2 is set in a very small range at the lower right end portion on the contour of the irradiation field on the mamma image. Therefore, for example, as illustrated in FIG. 18, at the horizontal search range H1, the irradiation field contour on the mamma image becomes approximately identical with a horizontal line. Also, as illustrated in FIG. 19, at the vertical search range V1, the irradiation field contour on the mamma image becomes approximately identical with a vertical line. In this embodiment, only the horizontal search range H1 is illustrated in FIG. 18, and only the vertical search range V1 is illustrated in FIG. 19.

Figure 20:
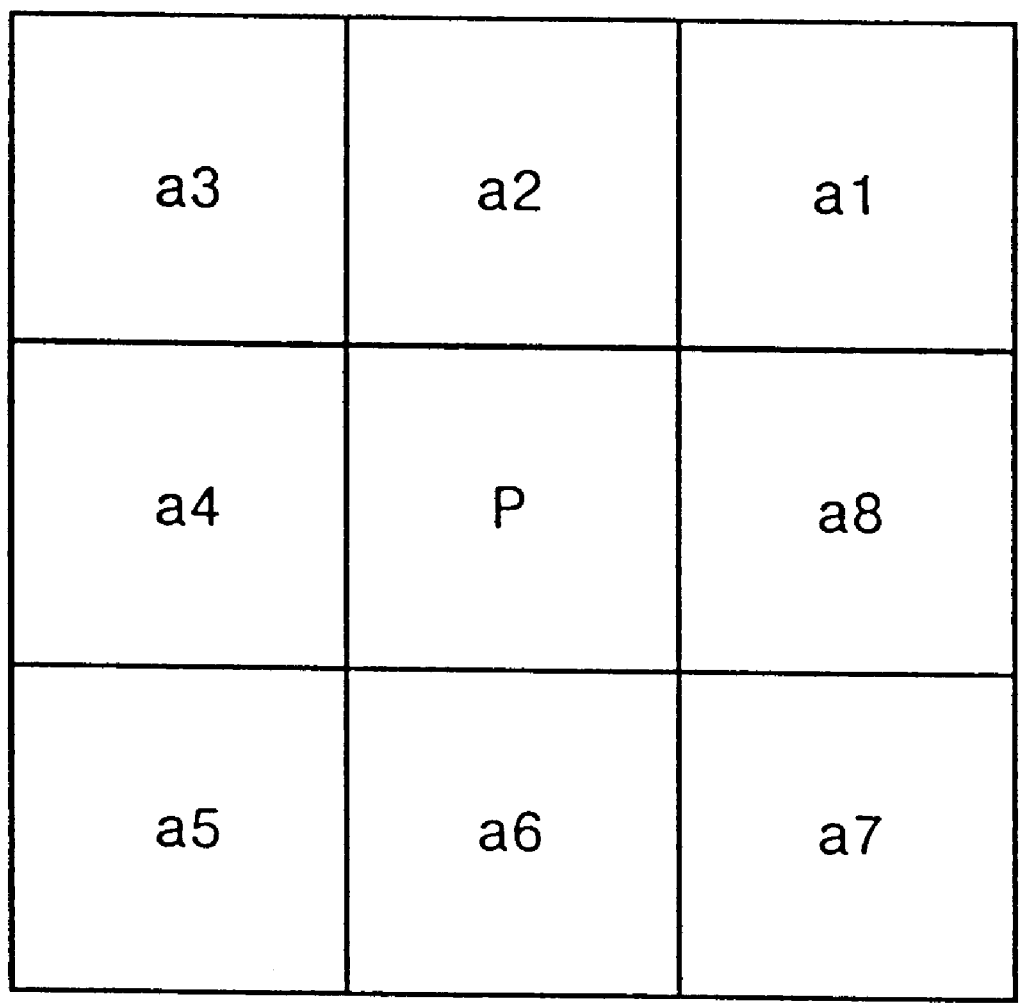
FIG. 20 is an explanatory view showing a picture element of interest and eight neighboring picture elements.

Thereafter, in the translation distance calculating means 3, translation distance of the template with respect to the mamma image is calculated. Firstly, each of all picture elements located in the horizontal search range H1 is set as a picture element of interest. With respect to each picture element of interest, differentiation values between the picture element value of the picture element of interest and the picture element values of the eight neighboring picture elements are calculated, and a median value M of the differentiation values is calculated. Specifically, as illustrated in FIG. 20, in cases where the picture element value of the picture element of interest is represented by P, the differentiation values between the picture element value P and picture element values, a1 through a8, of the eight neighboring picture elements are calculated, and the median value M of the differentiation values is calculated. The calculation is made with Formula (1) shown below.

$$M=\mathrm{med}(ai\text{-}P)^2 (\text{where } 0<i\leq 8) \quad (1)$$

All of the picture elements located in the horizontal search range H1 are successively taken as the picture element of interest, and the median values M are calculated with respect to all of the picture elements located in the horizontal search range H1. Thereafter, coordinate values Mj(x, y) of the picture element, which is associated with the largest median value M, are calculated with Formula (2) shown below. In this embodiment, the horizontal direction is taken as the x direction, and the vertical direction is taken as the y direction.

$$Mj(x, y)=\mathrm{max}M=\mathrm{max}\{\mathrm{med}(ai\text{-}P)^2\} \quad (2)$$

The coordinate values Mj(x, y) represent the position on the contour line of the irradiation field on the mamma image within the horizontal search range H1.

Thereafter, the vertical distance between the point having the coordinate values Mj(x, y) and the horizontal coordinate point P1 in the horizontal search range H1 is calculated.

In the same manner, coordinate values Mj(x, y) are calculated with respect to the horizontal search ranges H2 and H3. Also, calculations are made to find the vertical distance between the point having the coordinate values Mj(x, y) and the horizontal coordinate point P2 in the horizontal search range H2, and the vertical distance between the point having the coordinate values Mj(x, y) and the horizontal coordinate point P3 in the horizontal search range H3.

Thereafter, a calculation is made to find the mean value of the vertical distance between the point having the coordinate values Mj(x, y) and the horizontal coordinate point P1 in the horizontal search range H1, the vertical distance between the point having the coordinate values Mj(x, y) and the horizontal coordinate point P2 in the horizontal search range H2, and the vertical distance between the point having the coordinate values Mj(x, y) and the horizontal coordinate point P3 in the horizontal search range H3. The thus calculated mean value is taken as a translation distance v of the template along the vertical direction. Specifically, in each of the horizontal search ranges H1, H2, and H3, the value of the difference between the y-coordinate value of the coordinate values Mj(x, y) and the y-coordinate value of each of the horizontal coordinate points P1, P2, and P3 is calculated, and the absolute value of the difference value is thus found with respect to each of the horizontal coordinate points P1, P2, and P3. Thereafter, the mean value of the thus obtained absolute values is calculated. In cases where the coordinate values of each of the horizontal coordinate points P1, P2, and P3 are represented by Tj(x, y), the translation distance v is calculated with Formula (3) shown below.

$$v = \mathrm{ave}|Mj(y) - Tj(y)| \qquad (3)$$

Thereafter, with respect to the vertical search ranges V1 and V2, calculations are made in the same manner as that for the horizontal search ranges H1, H2, and H3. Specifically, each of all picture elements located in each of the vertical search ranges V1 and V2 is set as a picture element of interest. With respect to each picture element of interest, differentiation values between the picture element value of the picture element of interest and the picture element values of the eight neighboring picture elements are calculated, and a median value M of the differentiation values is calculated with Formula (1) shown above. All of the picture elements located in each of the vertical search ranges V1 and V2 are successively taken as the picture element of interest, and the median values M are calculated with respect to all of the picture elements located in each of the vertical search ranges V1 and V2. Thereafter, in each of the vertical search ranges V1 and V2, coordinate values Mj(x, y) of the picture element, which is associated with the largest median value M, are calculated with Formula (2) shown above. The thus found coordinate values Mj(x, y) represent the position on the contour line of the irradiation field on the mamma image within each of the vertical search ranges V1 and V2.

Thereafter, the horizontal distance between the point having the coordinate values Mj(x, y) and the vertical coordinate point P4 in the vertical search range V1 is calculated. Also, the horizontal distance between the point having the coordinate values Mj(x, y) and the vertical coordinate point P5 in the vertical search range V2 is calculated. A calculation is then made to find the mean value of the thus calculated horizontal distances. The thus calculated mean value is taken as a translation distance u of the template along the horizontal direction. Specifically, in each of the vertical search ranges V1 and V2, the value of the difference between the x-coordinate value of the coordinate values Mj(x, y) and the x-coordinate value of each of the vertical coordinate points P4 and P5 is calculated, and the absolute value of the difference value is thus found with respect to each of the vertical coordinate points P4 and P5. Thereafter, the mean value of the thus obtained absolute values is calculated. In cases where the coordinate values of each of the vertical coordinate points P4 and P5 are represented by Tj(x, y), the translation distance u is calculated with Formula (4) shown below.

$$u = \mathrm{ave}|Mj(x) - Tj(x)| \qquad (4)$$

Thereafter, with the translation means 4, the template is translated with respect to the mamma image in accordance with the translation distances u and v having been calculated in the manner described above. In this manner, the matching of the positions of the template and the mamma image with each other, i.e. the template matching, is carried out. After the template matching has been finished, a blackening process for blackening the region outside of the object image portion on the mamma image, or the like, is carried out.

As described above, with this embodiment of the template matching device in accordance with the present invention, the horizontal search ranges H1, H2, H3 and the vertical search ranges V1, V2 are set on the mamma image. Also, calculations with Formulas (1), (2), (3), and (4) are carried out with respect to the picture elements located in the horizontal search ranges H1, H2, H3 and the vertical search ranges V1, V2, and the translation distances u and v of the template with respect to the mamma image are thereby calculated. The template is then translated by the translation distances u and v with respect to the mamma image, and the template matching is thereby carried out. Therefore, the time required to carry out the calculations for the template matching can be kept markedly shorter than with the conventional technique, in which the calculations for the template matching are carried out with respect to all of the picture elements in the image by shifting the image and the template successively by a distance corresponding to a single picture element.

In this embodiment of the template matching device, with Formula (1) shown above, the median value M of the differentiation values between the picture element value P of the picture element of interest and the picture element values, a1 through a8, of the eight neighboring picture elements is calculated. Alternatively, instead of the median value M being calculated, only the differentiation values may be calculated, and the process with Formula (2) and those that follow may then be carried out. However, in cases where the median value M of the differentiation values is utilized, the position having the coordinate values Mj(x, y) can be found more accurately.

Also, in this embodiment of the template matching device, the template matching of the template and the mamma image with each other is carried out. However, the image to be subjected to the template matching is not limited to the mamma image. The template matching method and apparatus in accordance with the present invention are applicable to the template matching with respect to various kinds of images, in which an object pattern having a predetermined shape is embedded, the object pattern having horizontal line components, which are located approximately along a horizontal direction with respect to a predetermined direction, and vertical line components, which are located approximately along a vertical direction that is normal to the horizontal direction. Examples of such images include radiation images, which have been recorded by using rectangular or circular collimation plates, and images, in which an object pattern having a rectangular, circular, or semicircular shape is embedded.

Further, in this embodiment of the template matching device, the coordinate points P1 through P5 are set previously on the contour line of the template, and the horizontal search ranges and the vertical search ranges are set such that they may contain the coordinate points P1 through P5. Alternatively, the horizontal search ranges and the vertical search ranges may be set previously, and the coordinate points may then be set on the template contour line in the search ranges.

What is claimed is:

1. A method of blackening processing for a region outside of an irradiation field, wherein a blackening process for a region outside of an irradiation field is carried out on a radiation image, which has been recorded by use of a collimation plate and has an irradiation field thereon, the method comprising the steps of:
   i) storing information representing a template, which has an irradiation field shape determined by a collimation plate used in an operation for recording a radiation image to be processed,
   ii) defining an irradiation field on the radiation image in accordance with said template, and
   iii) carrying out a blackening process for a region outside of the thus defined irradiation field on the radiation image,
   wherein the method further comprises the step of carrying out matching of said template and the radiation image with each other, and the irradiation field is defined through said matching.

2. A method of blackening processing for a region outside of an irradiation field as defined in claim 1 wherein a plurality of pieces of information representing different templates are stored, and the method further comprises the steps of:

inputting information concerning an irradiation field shape on the radiation image to be processed, and selecting a piece of information, which represents a template corresponding to said irradiation field shape, from the plurality of pieces of information representing different templates and in accordance with said inputted information.

3. A method of blackening processing for a region outside of an irradiation field as defined in claim 1 wherein a plurality of pieces of information representing different templates are stored, and the method further comprises the step of:

selecting a piece of information, which represents a template corresponding to the irradiation field shape, from the plurality of pieces of information representing different templates and in accordance with an image signal, which represents the radiation image to be processed.

4. A method of blackening processing for a region outside of an irradiation field as defined in claim 1 wherein the method further comprises the step of forming said template.

5. The method according to claim 1, wherein said step of matching the template with the radiation image comprises matching an orientation of the template with the radiation image.

6. An apparatus for blackening processing for a region outside of an irradiation field, wherein a blackening process for a region outside of an irradiation field is carried out on a radiation image, which has been recorded by use of a collimation plate and has an irradiation field thereon, the apparatus comprising:

i) a template information storing means for storing information representing a template, which has an irradiation field shape determined by a collimation plate used in an operation for recording a radiation image to be processed, and ii) a blackening process means for defining an irradiation field on the radiation image in accordance with said template and carrying out a blackening process for a region outside of the irradiation field on the radiation image, wherein the apparatus further comprises a matching means for carrying out matching of said template and the radiation image with each other, and the irradiation field is defined through said matching.

7. An apparatus for blackening processing for a region outside of an irradiation field as defined in claim 6 wherein said template information storing means stores a plurality of pieces of information representing different templates, and the apparatus further comprises:

an input means for inputting information concerning an irradiation field shape on the radiation image to be processed, and a first template selecting means for selecting a piece of information, which represents a template corresponding to said irradiation field shape, from the plurality of pieces of information representing different templates and in accordance with said information inputted from said input means.

8. An apparatus for blackening processing for a region outside of an irradiation field as defined in claim 6 wherein said template information storing means stores a plurality of pieces of information representing different templates, and the apparatus further comprises a second template selecting means for selecting a piece of information, which represents a template corresponding to the irradiation field shape, from the plurality of pieces of information representing different templates and in accordance with an image signal, which represents the radiation image to be processed.

9. An apparatus for blackening processing for a region outside of an irradiation field as defined in claim 6 wherein the apparatus further comprises a template forming section for forming said template.

10. The apparatus according to claim 6, wherein said matching means matches an orientation of the template with the radiation image.

11. A method of blackening processing for a region outside of an irradiation field, wherein a blackening process for a region outside of an irradiation field is carried out on a radiation image, which has been recorded by use of a collimation plate and has an irradiation field thereon, the method comprising the steps of:

i) determining a region, for which the blackening process is to be carried out, in accordance with one of at least two different recognition techniques for recognizing a region outside of an irradiation field, which have been set such that one of them is capable of being selected, ii) inputting image recording menu information, which represents an image recording menu employed in an image recording operation, and iii) selecting one of at least two said different recognition techniques in accordance with the inputted image recording menu information.

12. A method of blackening processing for a region outside of an irradiation field, wherein a blackening process for a region outside of an irradiation field is carried out on a radiation image, which has been recorded by use of a collimation plate and has an irradiation field thereon, the method comprising the steps of:

i) determining a region, for which the blackening process is to be carried out, in accordance with one of at least two different recognition techniques for recognizing a region outside of an irradiation field, which have been set such that one of them is capable of being selected, ii) inputting image recording menu information, which represents an image recording menu employed in an image recording operation, and iii) selecting one of at least two said different recognition techniques in accordance with the inputted image recording menu information, wherein at least two said different recognition techniques contain a first technique, with which the region outside of the irradiation field is recognized in accordance with an image signal representing the radiation image, and a second technique, with which the region outside of the irradiation field is recognized in accordance with template information corresponding to the collimation plate.

13. A method of blackening processing for a region outside of an irradiation field as defined in claim 12 wherein at least either one of said first technique and said second technique is a technique for recognizing the region outside of the irradiation field by utilizing said image recording menu information.

14. A method of blackening processing for a region outside of an irradiation field as defined in claim 11, 12, or 13 wherein the method further comprises the steps of:
   displaying the determined blackening process region as a visible image, and
   correcting the displayed blackening process region.

15. A method of blackening processing for a region outside of an irradiation field as defined in claim 12 or 13 wherein an automatic forming technique, with which said template information is formed automatically in accordance with said image signal, and a manual forming technique, with which said template information is formed manually by using a user interface, are set such that they are capable of being selectively changed over to each other.

16. A method of blackening processing for a region outside of an irradiation field, wherein a blackening process for a region outside of an irradiation field is carried out on a radiation image, which has been recorded by use of a collimation plate and has an irradiation field thereon, the method comprising the steps of:
   i) determining a region, for which the blackening process is to be carried out, in accordance with one of at least two different recognition techniques for recognizing a region outside of an irradiation field, which have been set such that one of them is capable of being selected,
   ii) inputting image recording menu information, which represents an image recording menu employed in an image recording operation, and
   iii) selecting one of at least two said different recognition techniques in accordance with the inputted image recording menu information,
   wherein, besides at least two said different recognition techniques, a technique for recognizing the absence of a region outside of an irradiation field is also set such that it is capable of being selected.

17. A method of blackening processing for a region outside of an irradiation field as defined in claim 16 wherein, in cases where the determined blackening process region is represented by coordinate information and said technique for recognizing the absence of a region outside of an irradiation field is selected, as coordinate values, which represent said determined blackening process region, coordinate values are outputted such that the side outward from a coordinate region representing said image signal may be set as the blackening process region.

18. An apparatus for blackening processing for a region outside of an irradiation field, wherein a blackening process for a region outside of an irradiation field is carried out on a radiation image, which has been recorded by use of a collimation plate and has an irradiation field thereon, the apparatus comprising:
   i) a blackening process region determining means for determining a region (a blackening process region), for which the blackening process is to be carried out, in accordance with one of at least two different recognition techniques for recognizing a region outside of an irradiation field, which have been set such that one of them is capable of being selected,
   ii) an image recording menu information input means for inputting image recording menu information, which represents an image recording menu employed in an image recording operation, and
   iii) a control means for causing said blackening process region determining means to select one of at least two said different recognition techniques in accordance with the image recording menu information inputted from said image recording menu information input means.

19. An apparatus for blackening processing for a region outside of an irradiation field, wherein a blackening process for a region outside for an irradiation field is carried out on a radiation image, which has been recorded by use of a collimation plate and has an irradiation field thereon, the apparatus comprising:
   i) a blackening process region determining means for determining a region (a blackening process region), for which the blackening process is to be carried out, in accordance with one of at least two different recognition techniques for recognizing a region outside of an irradiation field, which have been set such that one of them is capable of being selected,
   ii) an image recording menu information input means for inputting image recording menu information, which represents an image recording menu employed in an image recording operation, and
   iii) a control means for causing said blackening process region determining means to select one of at least two said different recognition techniques in accordance with the image recording menu information inputted from said image recording menu information input means,
   wherein at least two said different recognition techniques contain a first technique, with which the region outside of the irradiation field is recognized in accordance with an image signal representing the radiation image, and a second technique, with which the region outside of the irradiation field is recognized in accordance with template information corresponding to the collimation plate.

20. An apparatus for blackening processing for a region outside of an irradiation field as defined in claim 19 wherein at least either one of said first technique and said second technique is a technique for recognizing the region outside of the irradiation field by utilizing said image recording menu information.

21. An apparatus for blackening processing for a region outside of an irradiation field as defined in claim 18, 19, or 20 wherein the apparatus further comprises:
   a displaying means for displaying the blackening process region, which has been determined by said blackening process region determining means, as a visible image, and
   a blackening process region correcting means for correcting the blackening process region, which is displayed on said displaying means.

22. An apparatus for blackening processing for a region outside of an irradiation field as defined in claim 19 or 20 wherein the apparatus further comprises a template information forming section constituted such that an automatic forming technique, with which said template information is formed automatically in accordance with said image signal, and a manual forming technique, with which said template information is formed manually by using a user interface, may be capable of being selectively changed over to each other.

23. An apparatus for blackening processing for a region outside of an irradiation field, wherein a blackening process for a region outside for an irradiation field is carried out on a radiation image, which has been recorded by use of A collimation plate and has an irradiation field thereon, A apparatus comprising:
   i) a blackening process region determining means for determining a region (a blackening process region), for which the blackening process is to be carried out, in accordance with one of at least two different recognition techniques for recognizing a region outside of an irradiation field, which have been set such that one of them is capable of being selected, ii) an image recording menu information input means for inputting image recording menu information, which represents an image recording menu employed in an image recording operation, and iii) a control means for causing said blackening process region determining means to select one of at least two said different recognition techniques in accordance with the image recording menu information inputted from said image recording menu information input means, wherein said blackening process region determining means is capable of selecting, besides at least two said different recognition techniques, a technique for recognizing the absence of a region outside of an irradiation field.

24. An apparatus for blackening processing for a region outside of an irradiation field as defined in claim 23 wherein said blackening process region determining means outputs the determined blackening process region as coordinate information and operates such that, in cases where said technique for recognizing the absence of a region outside of an irradiation field is selected, said blackening process region determining means may output, as coordinate values, which represent said determined blackening process region, coordinate values such that the side outward from a coordinate region representing said image signal may be set as the blackening process region.

25. A template matching method, wherein matching of an image, in which an object pattern having a predetermined shape is embedded, and a template, which has a contour of said predetermined shape, with each other is carried out, the object pattern having horizontal line components, which are located approximately along a horizontal direction with respect to a predetermined direction, and vertical line components, which are located approximately along a vertical direction that is normal to the horizontal direction, the method comprising the steps of:

i) setting a horizontal search range and a vertical search range on the image, said horizontal search range containing a horizontal coordinate point, which has been set on the contour of the template and corresponds to one of the horizontal line components, said vertical search range containing a vertical coordinate point, which has been set on the contour of the template and corresponds to one of the vertical line components, ii) calculating a vertical distance between the horizontal line component and the corresponding horizontal coordinate point in said horizontal search range, which distance is taken along the vertical direction, the calculation being made in accordance with picture element values of the image in said horizontal search range, iii) calculating a horizontal distance between the vertical line component and the corresponding vertical coordinate point in said vertical search range, which distance is taken along the horizontal direction, the calculation being made in accordance with picture element values of the image in said vertical search range, and iv) translating the template by said vertical distance and said horizontal distance with respect to the image, whereby the matching of the image and the template with each other is carried out.

26. A template matching device, wherein matching of an image, in which an object pattern having a predetermined shape is embedded, and a template, which has a contour of said predetermined shape, with each other is carried out, the object pattern having horizontal line components, which are located approximately along a horizontal direction with respect to a predetermined direction, and vertical line components, which are located approximately along a vertical direction that is normal to the horizontal direction, the device comprising:

i) a search range setting means for setting a horizontal search range and a vertical search range on the image, said horizontal search range containing a horizontal coordinate point, which has been set on the contour of the template and corresponds to one of the horizontal line components, said vertical search range containing a vertical coordinate point, which has been set on the contour of the template and corresponds to one of the vertical line components, ii) a vertical distance calculating means for calculating a vertical distance between the horizontal line component and the corresponding horizontal coordinate point in said horizontal search range, which distance is taken along the vertical direction, the calculation being made in accordance with picture element values of the image in said horizontal search range, iii) a horizontal distance calculating means for calculating a horizontal distance between the vertical line component and the corresponding vertical coordinate point in said vertical search range, which distance is taken along the horizontal direction, the calculation being made in accordance with picture element values of the image in said vertical search range, and iv) a translation means for translating the template by said vertical distance and said horizontal distance with respect to the image and thereby carrying out the matching of the image and the template with each other.

* * * * *